United States Patent [19]
Hawley et al.

[11] Patent Number: 5,533,192
[45] Date of Patent: Jul. 2, 1996

[54] COMPUTER PROGRAM DEBUGGING SYSTEM AND METHOD

[75] Inventors: Robert J. Hawley; Patricia A. Jemie, both of San Jose, Calif.

[73] Assignee: Apple Computer, Inc., Cupertino, Calif.

[21] Appl. No.: 230,798

[22] Filed: Apr. 21, 1994

[51] Int. Cl.$^6$ .................................................. G06F 11/34
[52] U.S. Cl. ............................. 395/183.04; 395/183.11; 364/927.81
[58] Field of Search ........................... 395/575, 183.04, 395/183.05, 183.1, 183.11, 183.13, 183.14; 371/19, 12, 5; 364/267.91, 927.81

[56] References Cited

U.S. PATENT DOCUMENTS

| | | | |
|---|---|---|---|
| 4,755,997 | 7/1988 | Takahashi | 371/19 |
| 4,924,382 | 5/1990 | Shauda | 364/200 |
| 4,937,864 | 6/1990 | Caseiras et al. | 371/19 |
| 5,321,828 | 6/1994 | Phillips et al. | 395/500 |
| 5,361,348 | 11/1994 | Nakamoto | 395/575 |
| 5,379,301 | 1/1995 | Sato et al. | 371/19 |

OTHER PUBLICATIONS

Apple Computer, Feb., 1990, "A/UX Programmer's Reference–Sections 2 and 3(A–L)" (pages pertaining to ptrace(2) and sigvec(2)).

Robert D. Gronlund et al., "The HP 64700 Embedded Debug Environment: A New Paradigm for Embedded System Integration and Debugging," *Hewlett–Packard Journal*, pp. 90–106, vol. 44, No. 2, Apr. 1993, Palo Alto, U.S.

John May & Francine Berman, "Panorama: A Portable, Extensible Parallel Debugger", *ACM Sigplan Notices*, pp. 96–106, vol. 28 No. 12, Dec. 1993, New York, U.S.

*Primary Examiner*—Robert W. Beausoliel, Jr.
*Assistant Examiner*—Trinh Tu
*Attorney, Agent, or Firm*—Burns, Doane, Swecker & Mathis

[57] ABSTRACT

A program debugging system has a core unit that includes a plurality of debugger memory areas, each uniquely associated with a corresponding one of a plurality of debuggers. The core unit responds to an exception condition by selecting one debugger from the plurality of debuggers, selection being made by determining which one of the debuggers is associated with the program exception. Then, computer state information and debugger state information are stored into a selected one of the debugger memory areas that is exclusively associated with the selected debugger, and the selected debugger is activated. A new debugger may register with the core unit, so that the new debugger is added to the plurality of debuggers. The activated debugger may send a debugging command to the core unit, which responds by updating debugger state information based on the received debugging command, and storing the updated debugger state information into the selected debugger memory area. When a debugger relinquishes control of the computer, the core unit retrieves the updated debugger state information from the selected debugger memory area, and controls the hardware resources in accordance therewith. If the updated debugger state information includes an indication that a breakpoint is set, the core unit sets a breakpoint that includes information associating the set breakpoint with the selected debugger. When the breakpoint is triggered, the core unit identifies from the breakpoint information which of the debuggers the breakpoint is associated with, and activates the identified debugger.

21 Claims, 17 Drawing Sheets

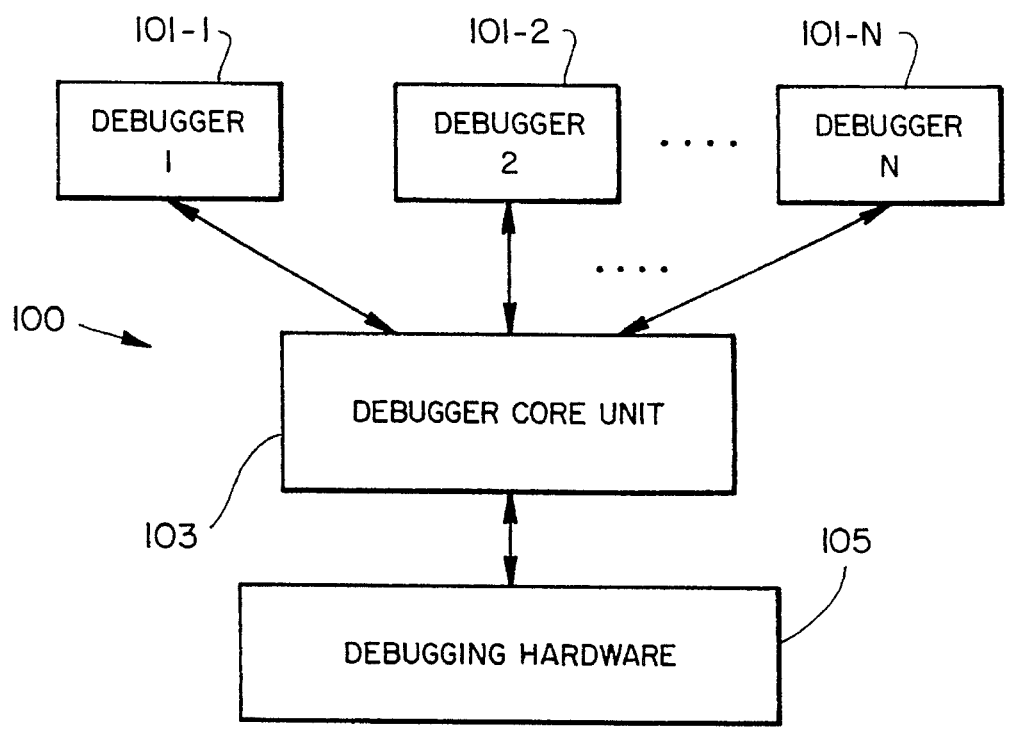
FIG_1
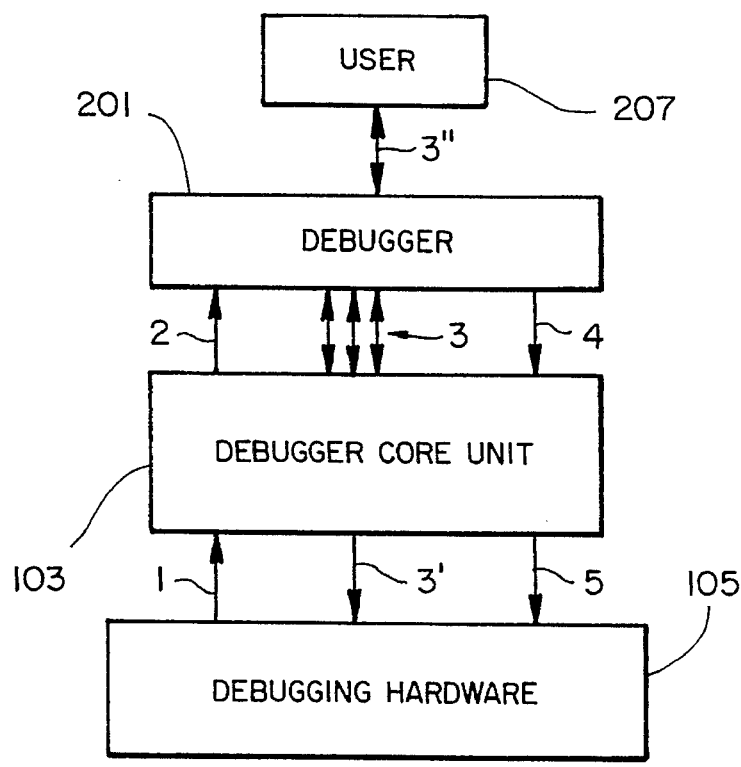
FIG_2a

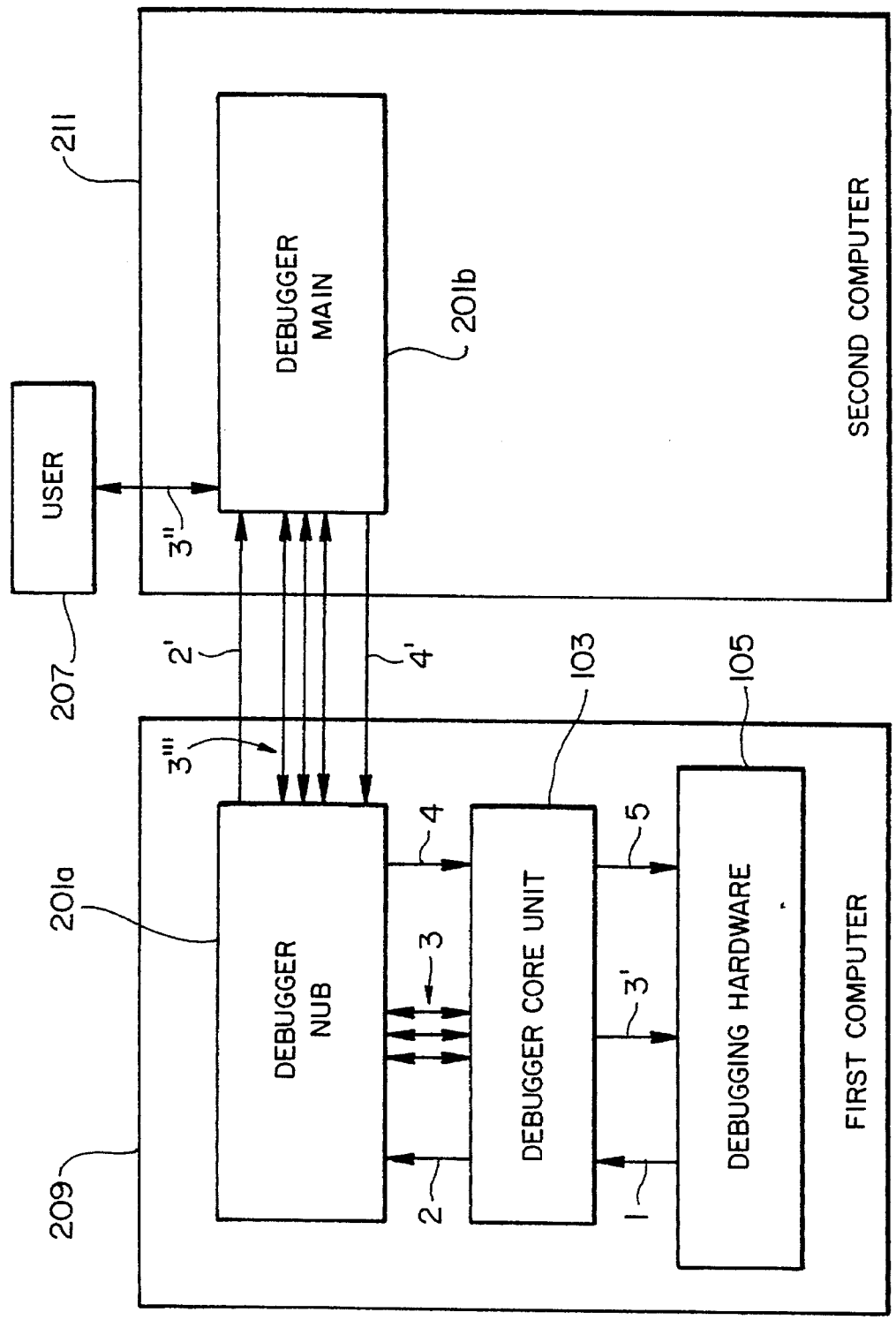
FIG_2b

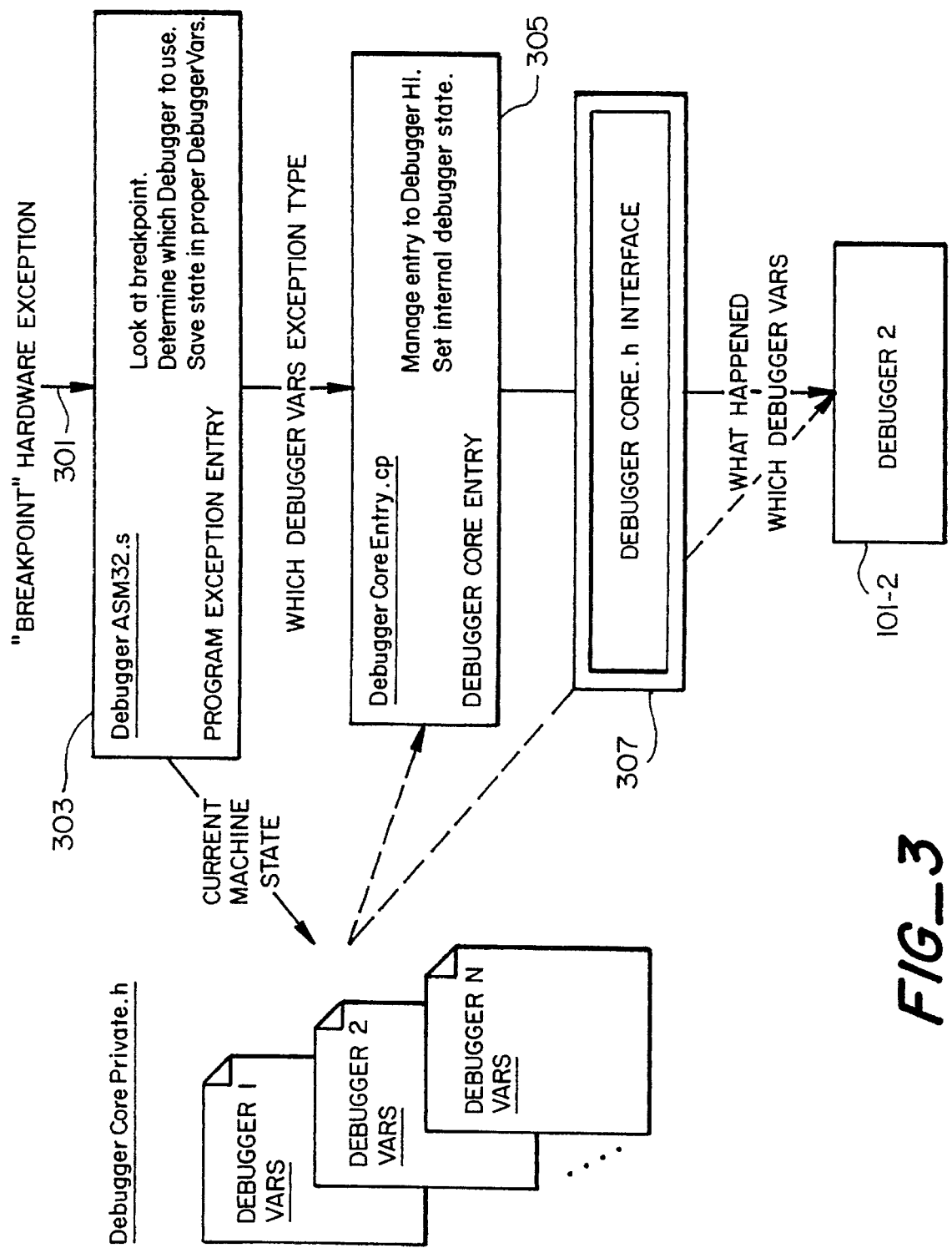
FIG_3

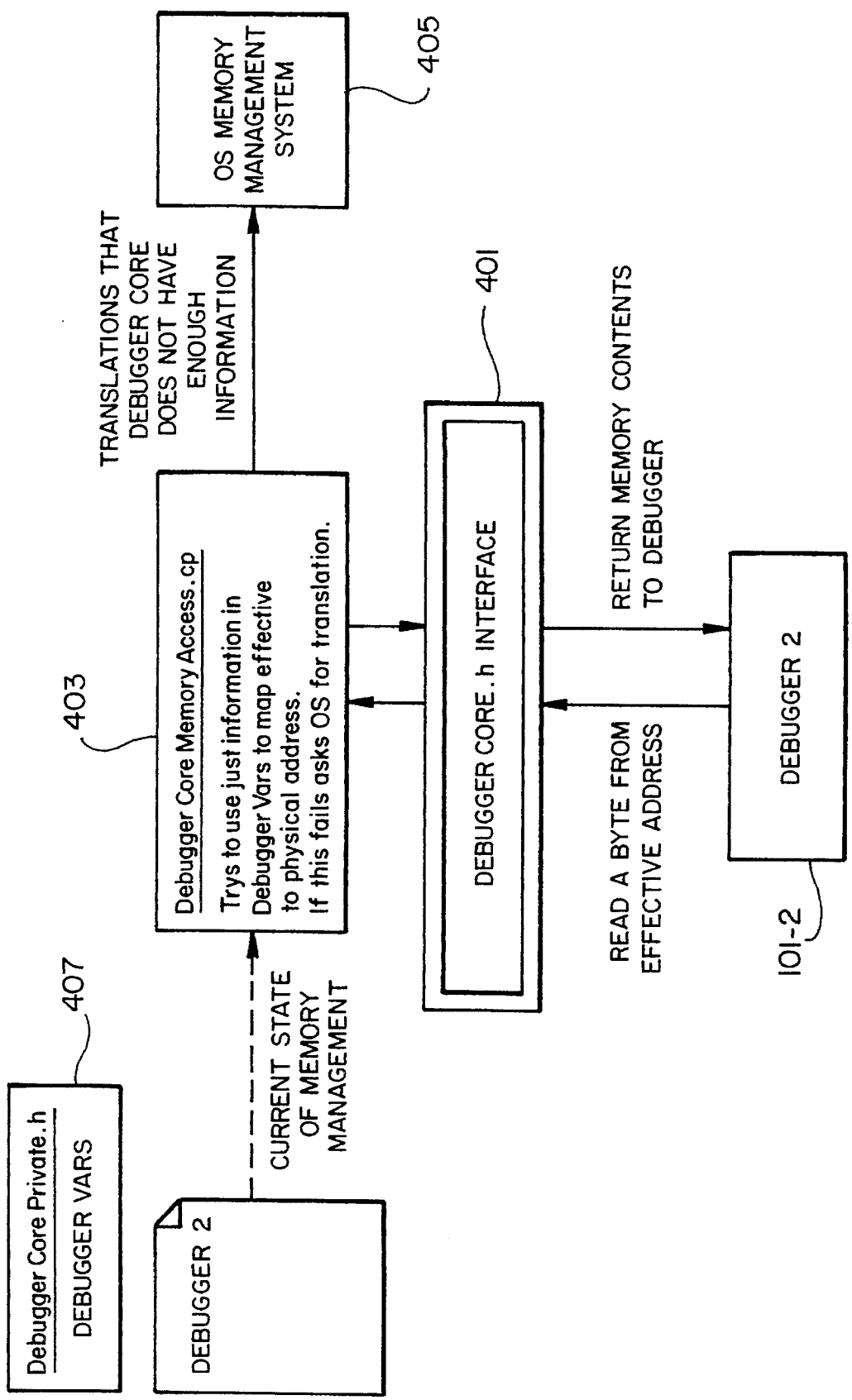
FIG_4

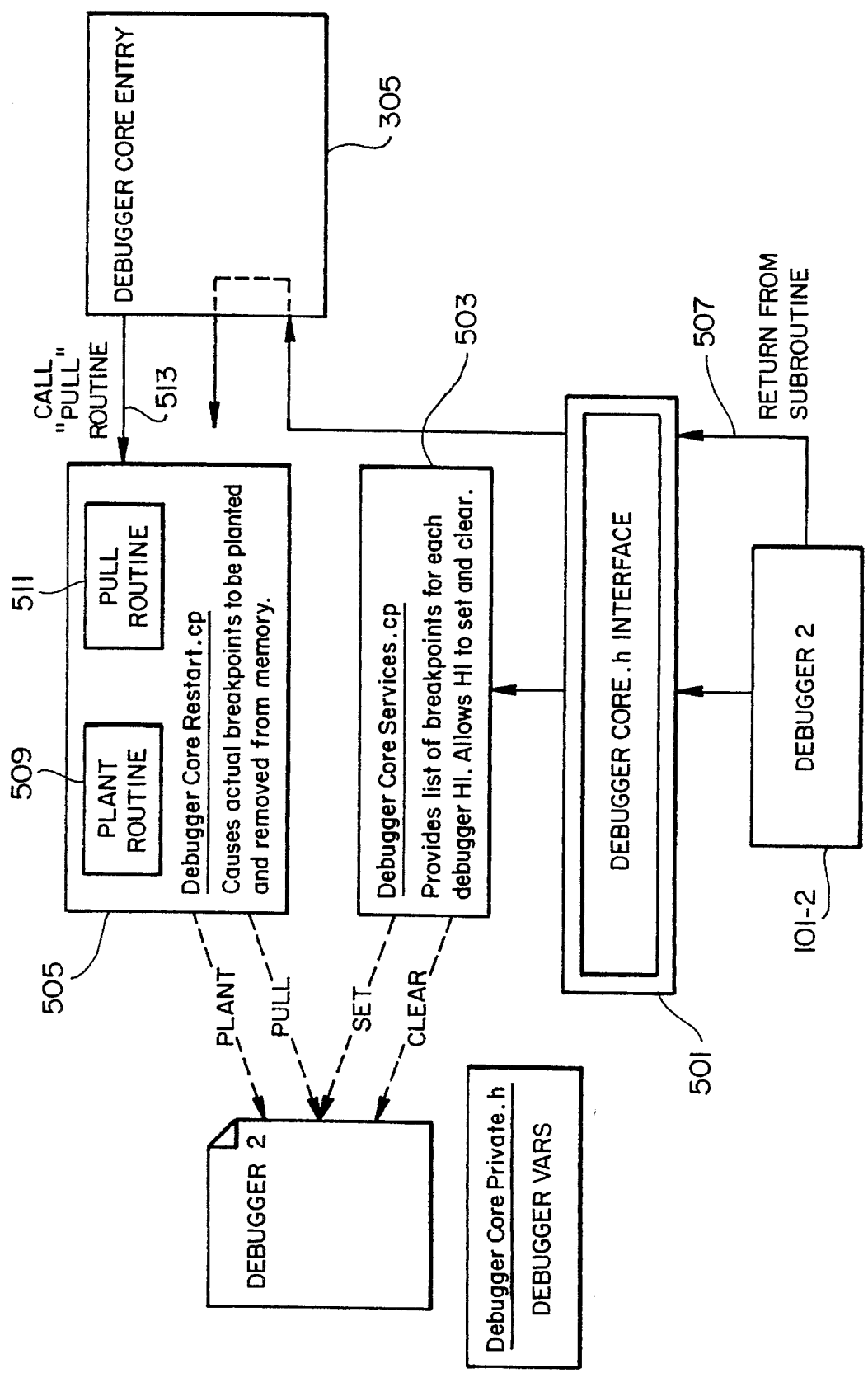
FIG_5

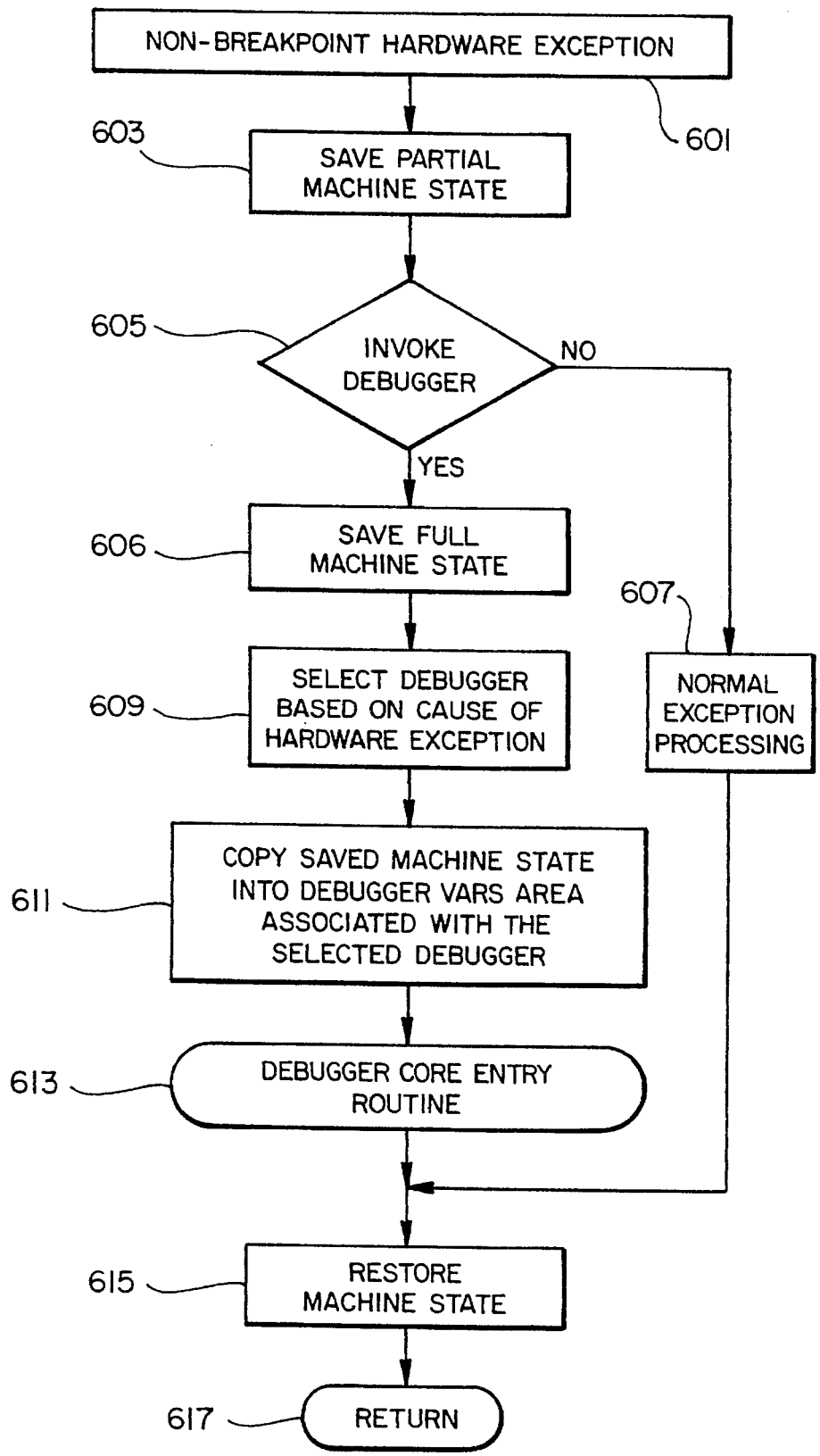
FIG_6

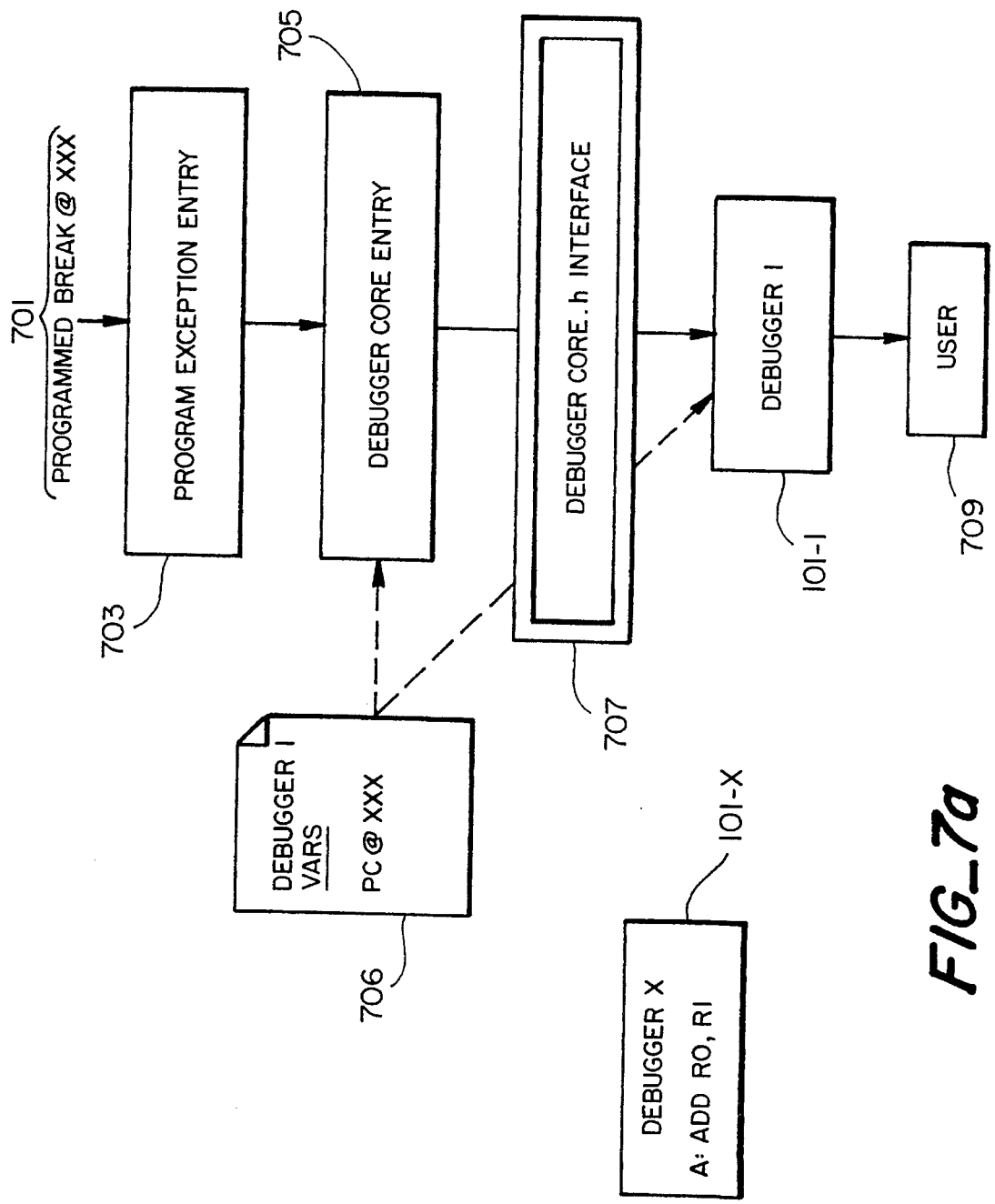
FIG_7a

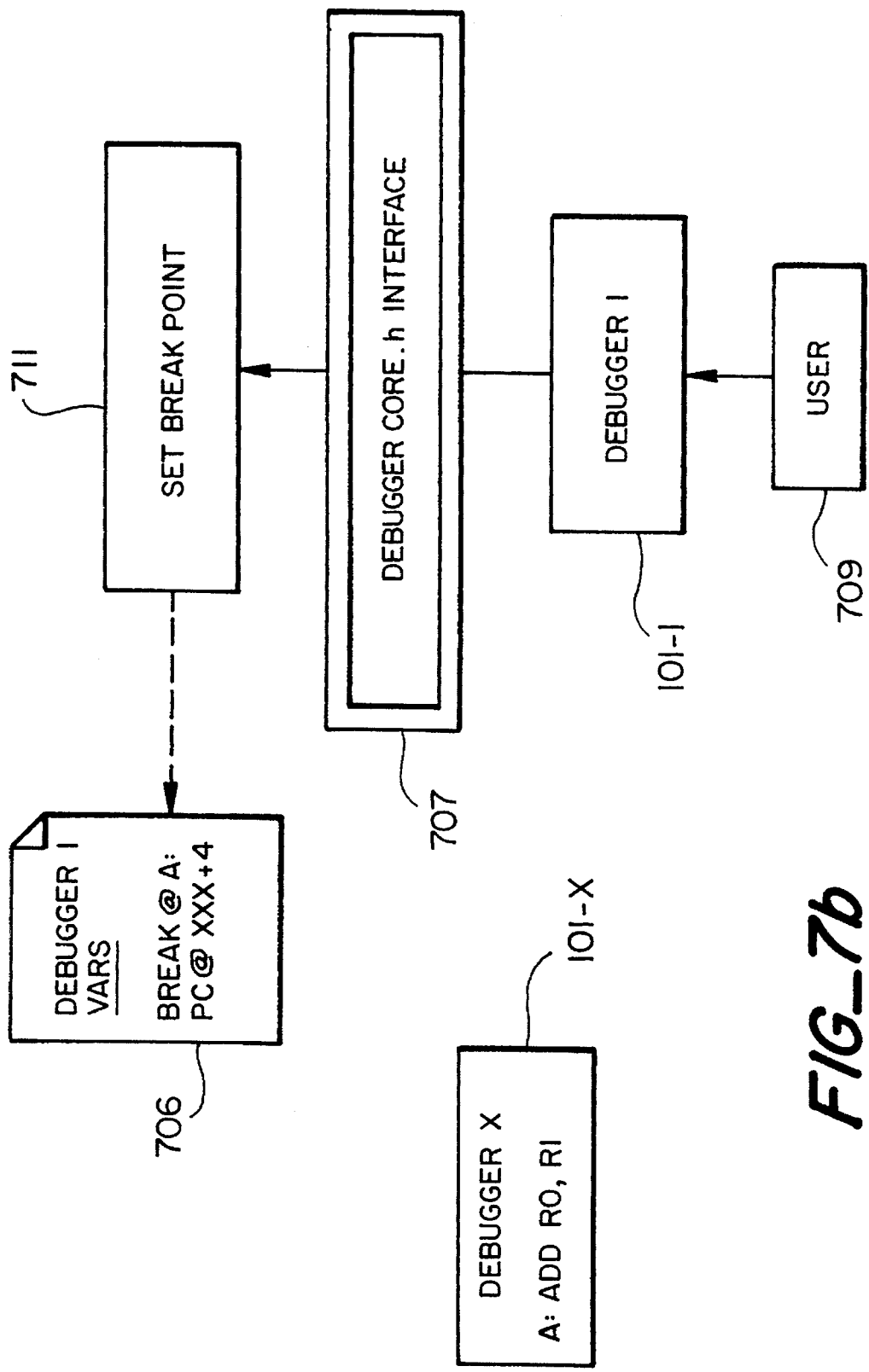
FIG_7b

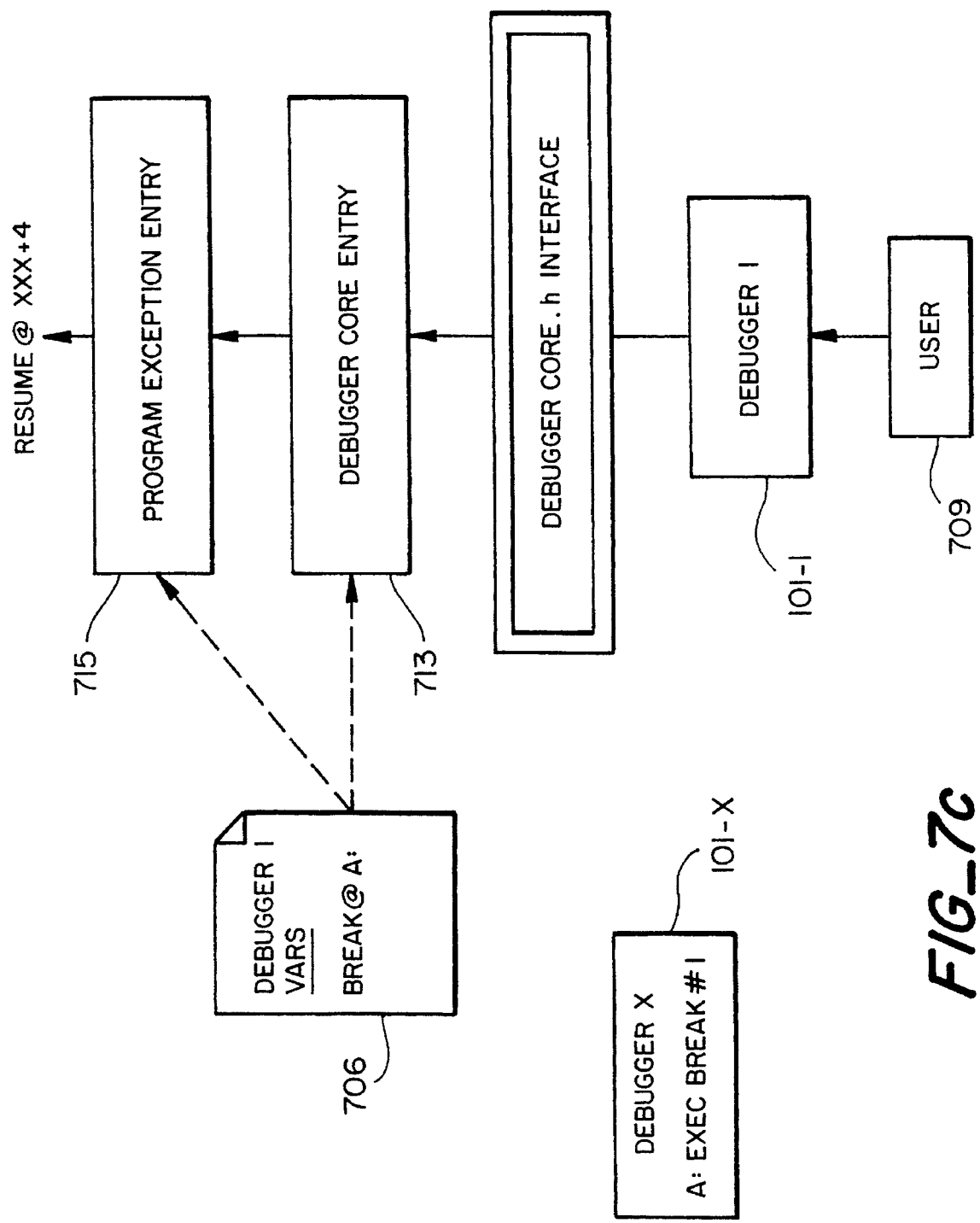
FIG_7c

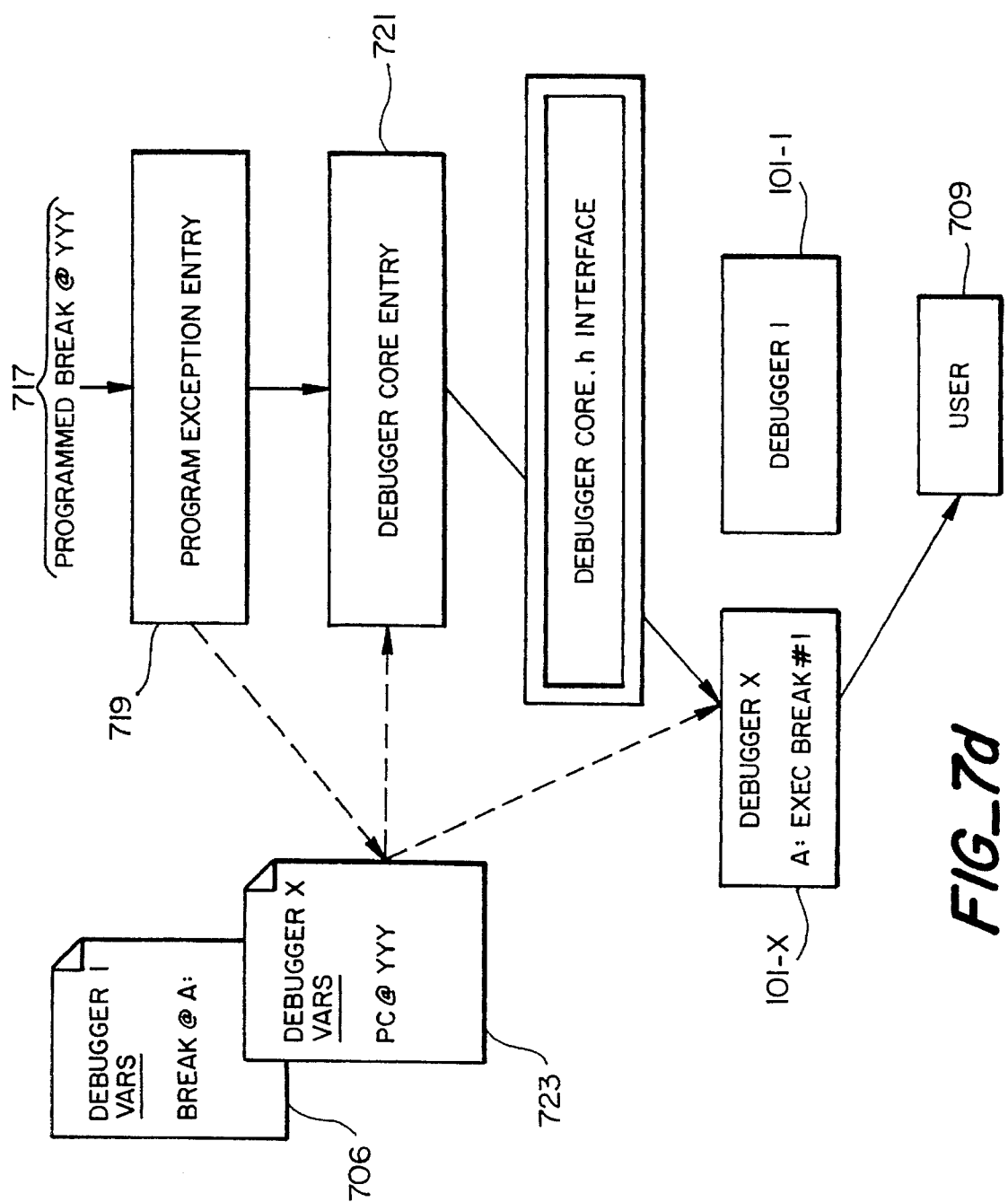
FIG_7d

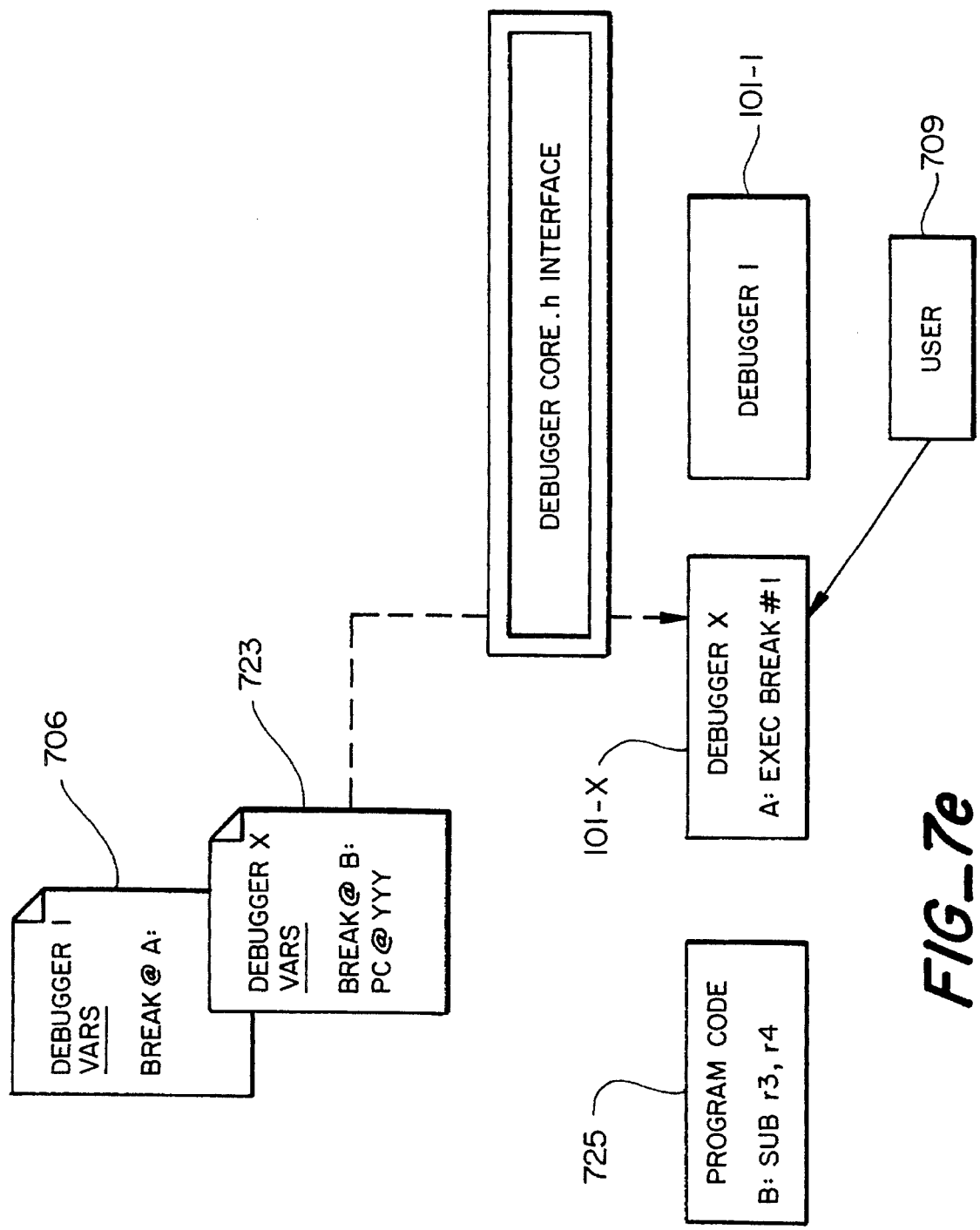
FIG_7e

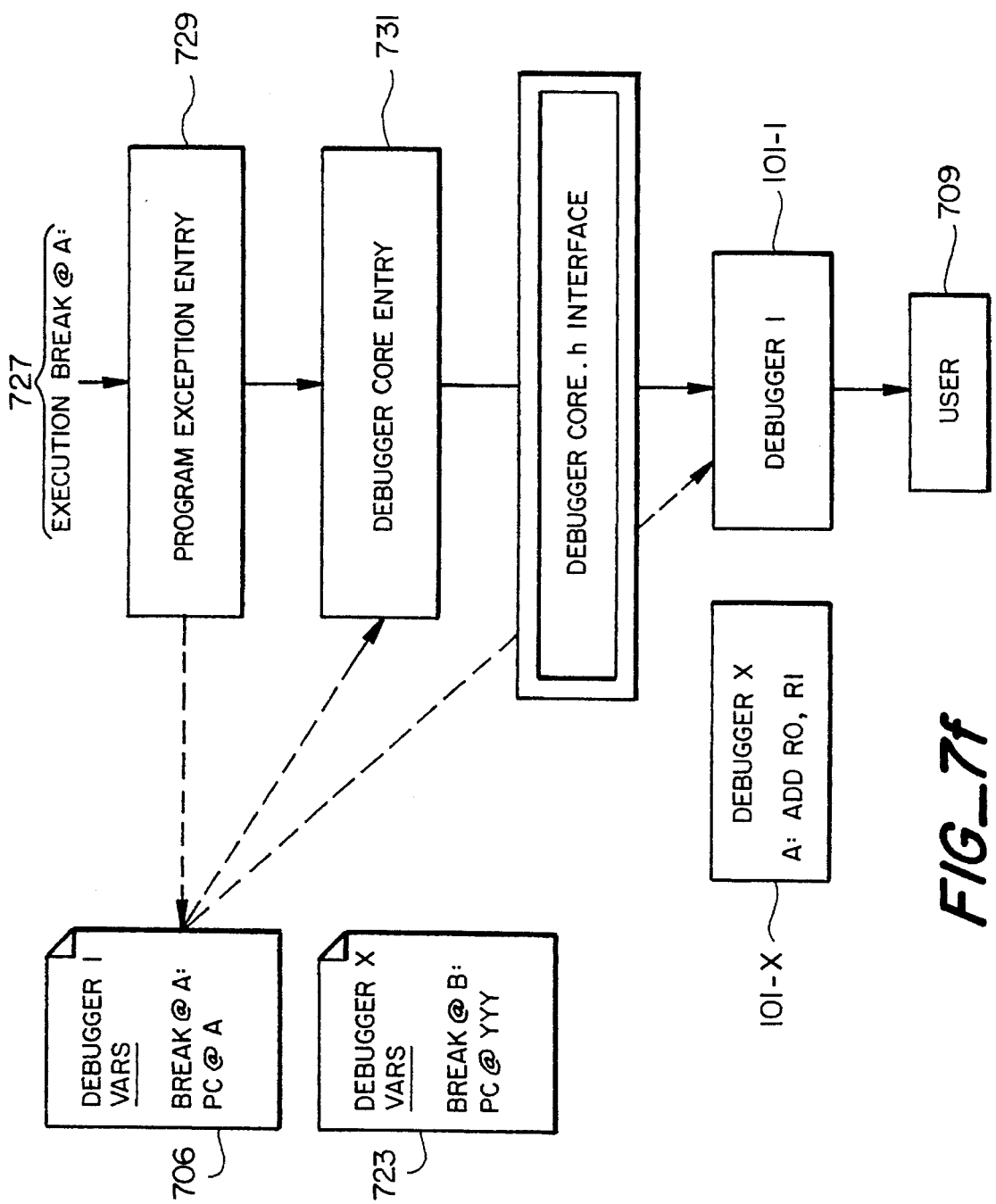

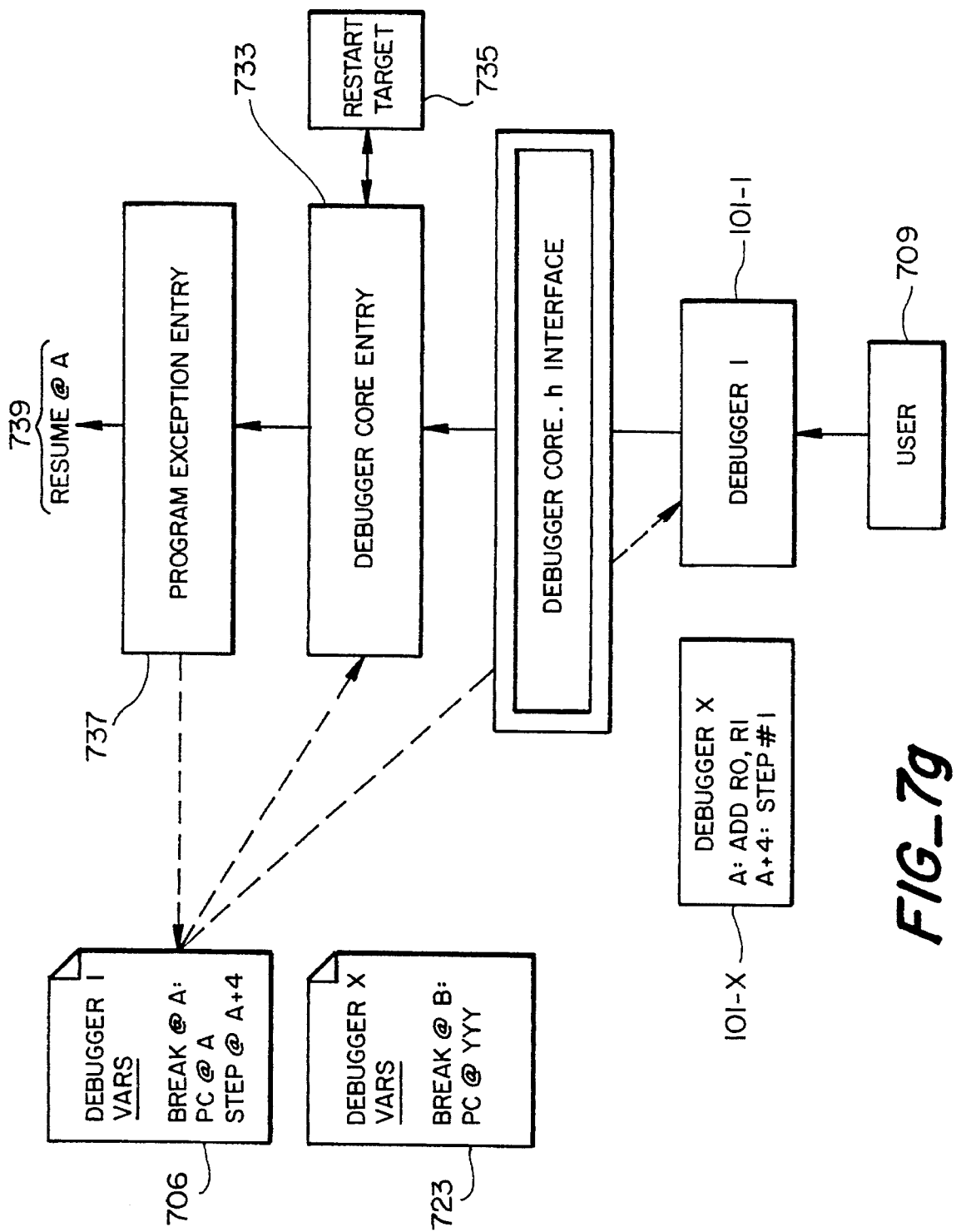
FIG_7g

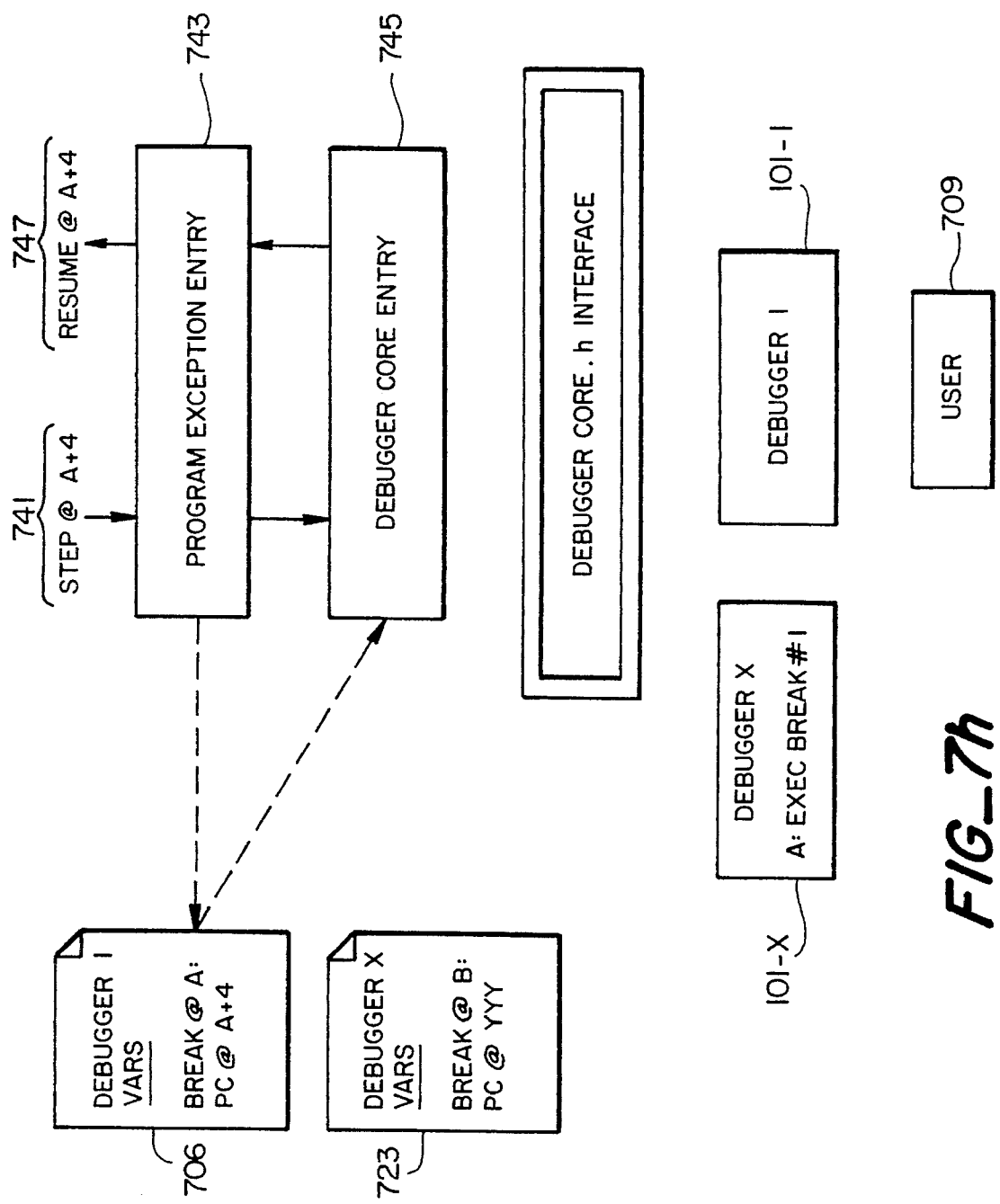
FIG_7h

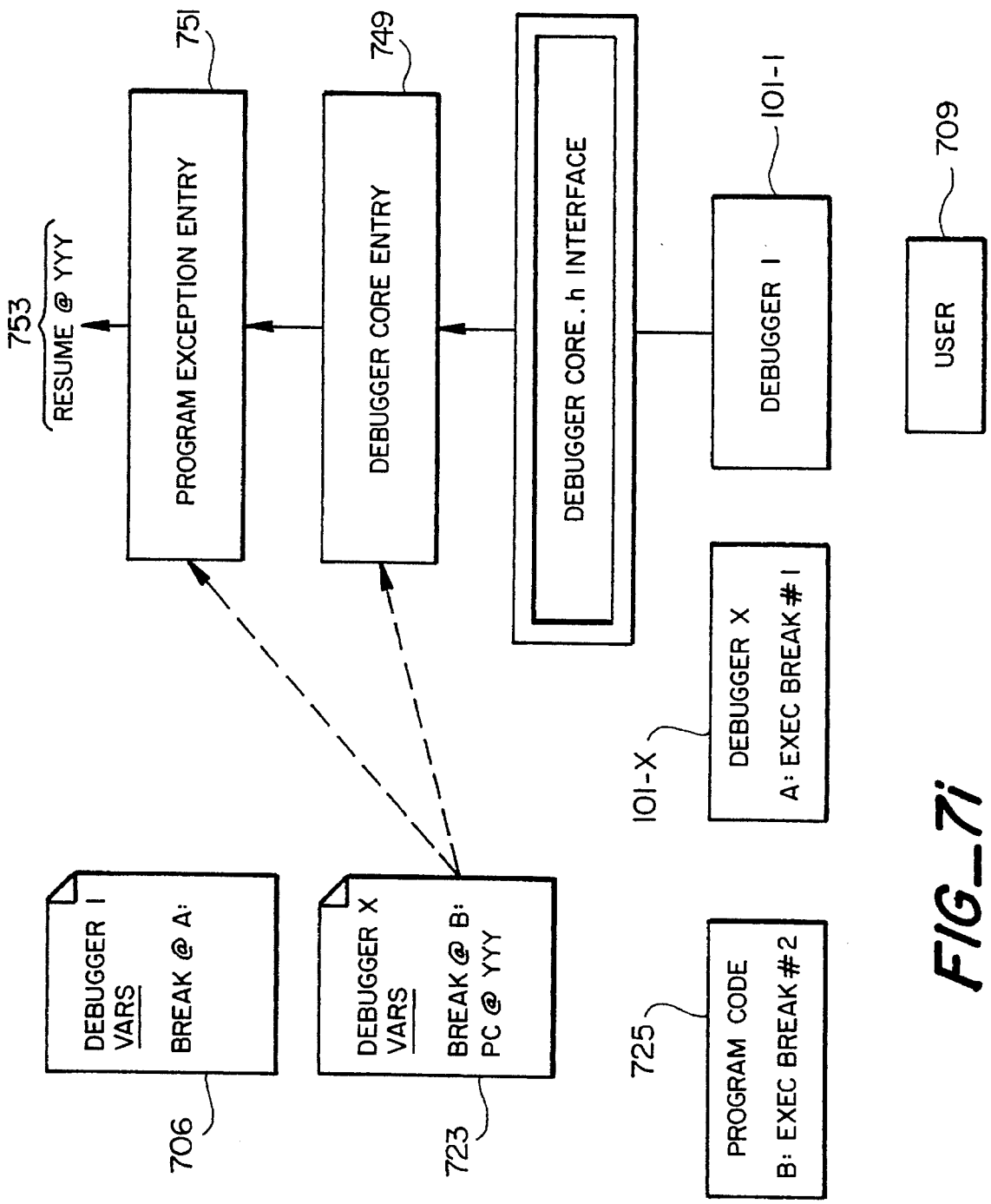
FIG_7i

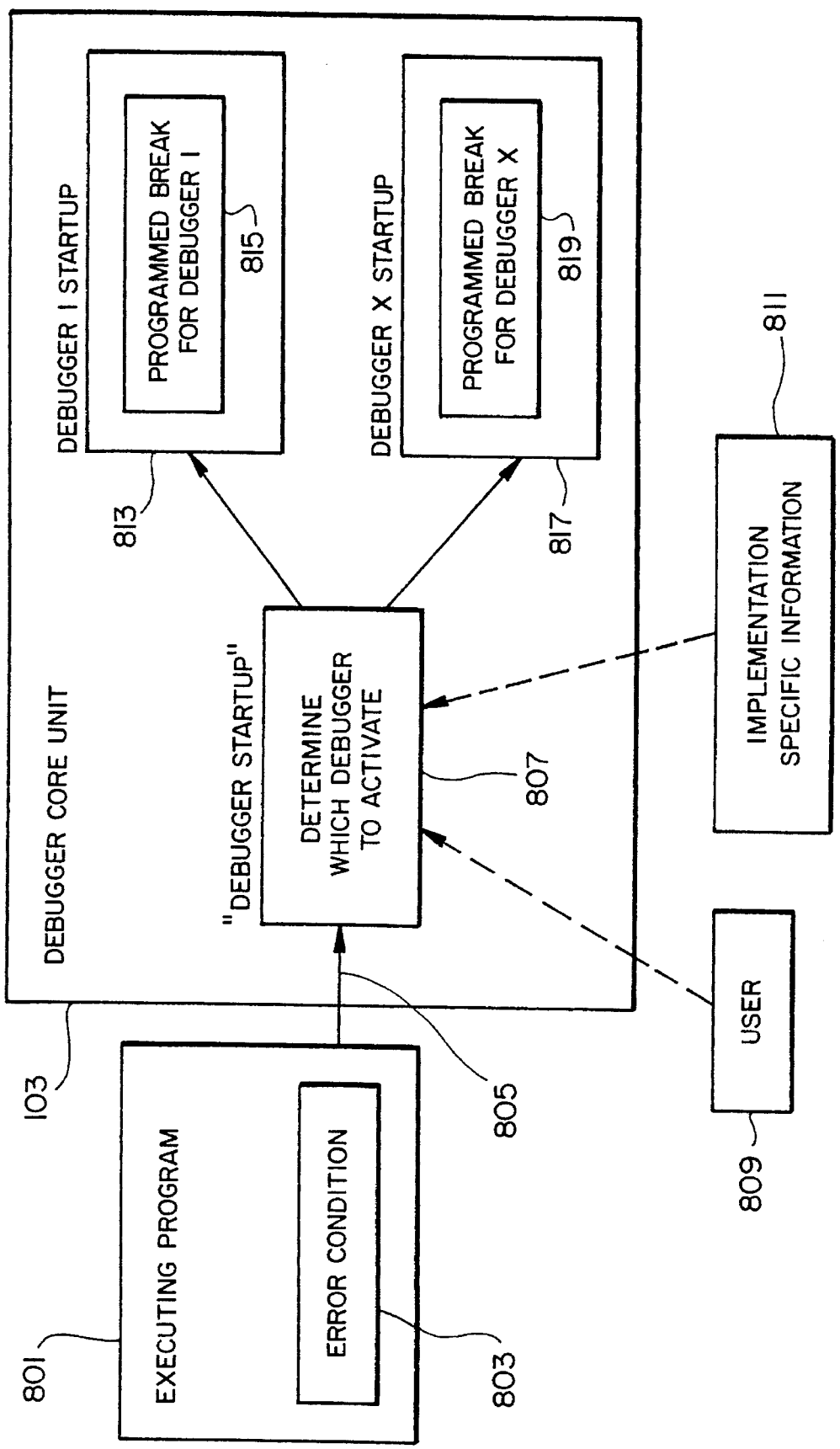
FIG_8a

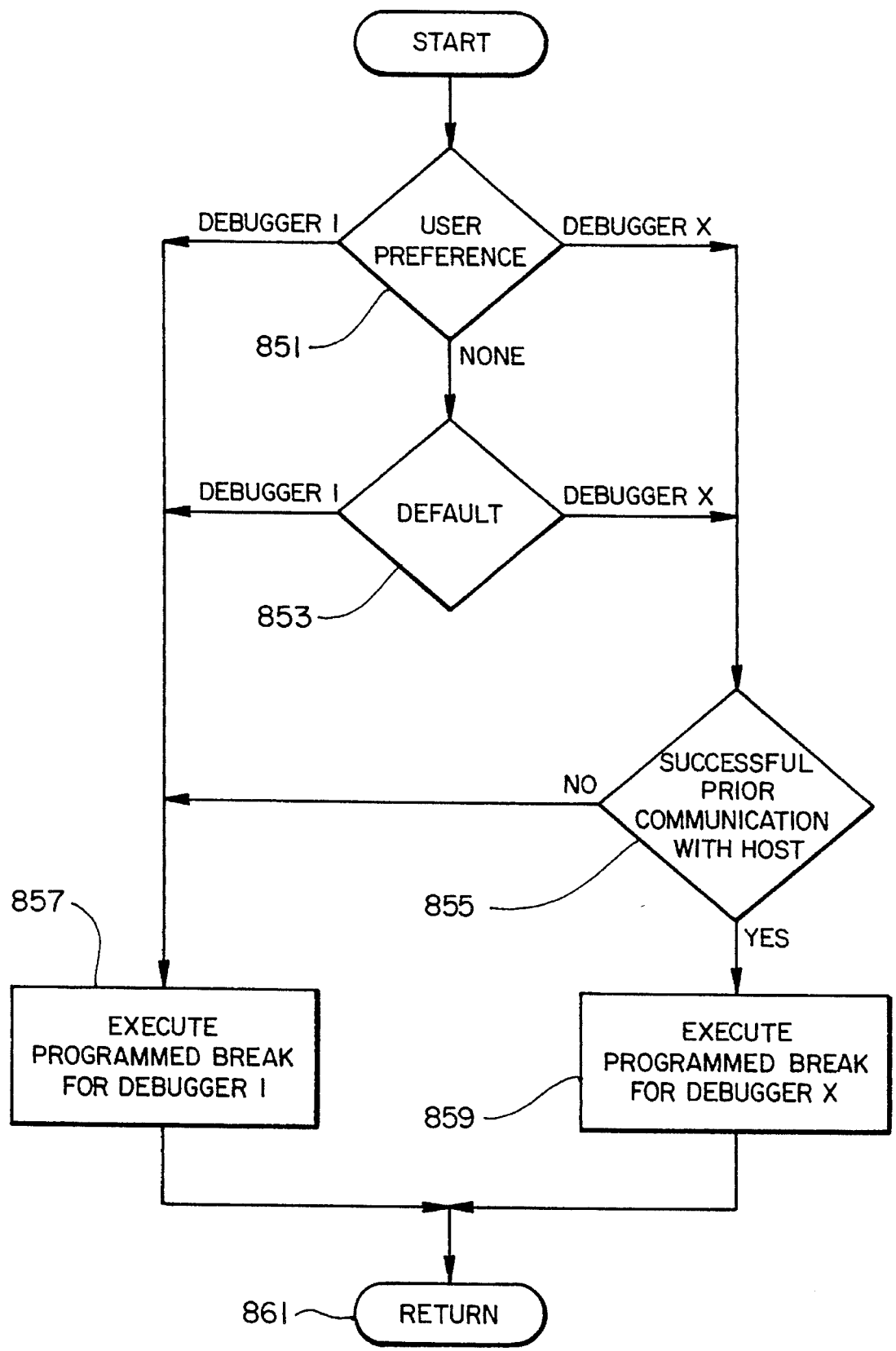
FIG_8b

COMPUTER PROGRAM DEBUGGING SYSTEM AND METHOD

BACKGROUND

The present invention relates to a system for debugging computer programs, and more particularly, to a system that provides concurrent operation of several computer program debuggers within one computer.

The design and use of computer hardware and programs are well known in the art, and need not be described here in any great detail. The following overview is presented merely to provide a context within which the present invention may be understood.

A computer program, also referred to as softwares, is a set of instructions that directs the functioning of various computer hardware resources in order to accomplish a particular task. In order to run a computer program, that program is typically loaded into the computer's main memory, where each instruction within the program is stored at a unique location, specified by an address. The address locations occupied by the program is referred to as the instruction space of the program. During program execution, the computer's control unit fetches and executes instructions in sequence. Fetching begins at a predefined start location within the program, and continues in sequence unless some type of branch instruction is encountered, or some other event, such as an interrupt, occurs. Branch instructions and interrupts will cause the control unit to begin fetching instructions from a new location that is not the next sequential instruction address within the instructzion space. Program execution then proceeds in sequence beginning at this new memory location, until another branch or interrupt is encountered.

Although each computer instruction is really a set of electrical signals, each of which typically assumes one of two values, those who create, or write, computer programs usually use symbols that represent the various possible combinations of electrical signals. At the lowest level, these symbols may simply be a string of ones and zeroes, representing on a one for one basis each of the electrical signals that make up an instruction. More often, however, these symbols comprise alphanumeric characters which are arranged to form mnemonics in a programming language, each mnemonic representing an instruction or part of an instruction.

Programming languages, themselves, come in a variety of styles ranging from low level to high level. The lowest level languages are characterized by instruction mnemonics which are, for the most part, in a one to one correspondence with the set of machine level instructions (i.e., the electrical signal combinations that the computer controller hardware recognizes as instructions). Such languages, such as assembly languages, are cumbersome to work with, and require an intimate knowledge of the physical architecture and operation of the computer hardware resources. Such languages provide the advantage, however, of permitting low level control of the computer resources, which in turn can result in programs of minimal size that run very fast.

At the other extreme, high level programming languages allow the programmer to direct the computer operation by means of constructs that mimic English-like phrases, such as "if ... then ... else ...". While such high level languages are much easier for a human to write and understand, they usually cannot be directly understood by the computer. Instead, programs written in such languages must be converted, or "compiled" into a low level form that may be loaded and executed by the computer hardware. A drawback of this is that the compiler may generate low level code that is not as efficient as the set of low level instructions that the programmer would have produced, given the same task.

In addition to varying levels of programming languages, another aspect of creating a computer program relates to the fact that certain tasks, such as writing data to a video display terminal, reading a character from a keyboard, and accessing disk storage, are found in most programs. Since these tasks can rarely be accomplished with the use of a single machine level instruction, but rather each require a small program, it is inefficient to force each programmer to create these sub-programs within his own program. Consequently, such commonly used routines are typically organized within a single operating system which is executed on the computer hardware. The operating system can serve as an intermediating layer between the actual computer hardware, and the user's application program. Whenever the programmer needs to include a system function within the application program, a program instruction requesting that service, such as by means of a subroutine call, is encoded within the program. By the time the program is ready to be executed, the system components have been linked to the application program, so that any one program may be made up of portions that a particular programmer provides, and portions that are provided by others including the manufacturer of the operating system. During execution, the system subroutine call performs the requested system function, and then returns control to the application program.

One thing that all programs have in common is the need to ensure that they actually perform the task that they are designed to perform. The act of making this determination is generally referred to as testing the software, and the act of identifying the cause of a known problem, or "bug", in a program is called "debugging" the software. To facilitate this process, computer programs, called "debuggers" have been created. A debugger supplies a program control interface to the programmer that allows one to do such things as executing only one program instruction at a time (referred to as "single stepping" the program), determining what the next instruction to be executed is, examining and/or modifying computer register and memory locations, and setting breakpoints at particular locations within the program, whereby computer program execution will continue unimpeded until the breakpoint is the next location in the program that is to be executed by the computer. These features, and others, greatly assist the programmer in determining whether the sequence of program instruction execution is as expected, and whether the correct data is being moved from one computer resource to another. This view into the actual operation of the program allows the programmer to identify where an error has been made in the program design.

Because, as explained above, computer programs may be written in any of a variety of programming languages, and may additionally rely in varying degrees on operating system features, no one debugger will be the ideal debugging tool for all programs. Instead, different debugging tools will be most useful at correspondingly different points in the development cycle of a program. For example, during the first few weeks of an operating system bring up effort, the most helpful debugger may be a low level assembly language debugger that makes few assumptions about which operating system features are available. This may be seen by considering an example, such as debugging a memory management feature in an operating system. A memory manager manipulates certain hardware features so that an executing program sees its memory mapped in a way that makes programming easier by, for example making a "virtual" or "effective" address space appear to be a monotonically increasing set of addresses, when the physical addresses are not. It is apparent, in this instance,, that a debugger must not itself, in an attempt to access a particular memory location in response to a user command, be permitted to use the memory manager that it is trying to debug. Instead, such a low level debugger would essentially include only core features that are common to all debuggers, such as:

1) setting execution breakpoints;
2) examining and altering memory; and
3) examining and altering a saved processor state (i.e., the processor's general and special registers, any memory mappings, etc.).

Later, when the system is more mature, the most helpful debugger might be one that understands and uses operating system tables during a debugging session. Furthermore, in the lab, an engineer might find it most helpful to use a debugger having a windowed environment that permits the browsing of, and single stepping through, high level language source code. With such a debugger, the user need not be concerned with such things as the physical addresses of memory locations in which data variables are stored; instead, the debugger could allow the user to examine and modify data variables merely by specifying the symbolic name for the data variable that was used in the program.

Also, the operating system itself may provide another debugger that is aware of operating system tables, such as process control blocks, memory maps, loaded module areas, and the like.

Finally, after the program has completed the test phase and has been distributed, mysterious program failures (called "crashes") that occur in the field may be most easily debugged with the use of a simple low level debugger.

The above description is not to be construed as a hard and fast rule concerning what type of debugger to use at any particular time, since it is often the case that a programmer may find it desirable to be able to switch back and forth between any of a number of debuggers. Such may be the case, for example, if the programmer wants to use a first debugger to quickly single step through high level language program instructions up to a particular program location, and then switch to a low level debugger that will not only allow intimate access to the computer hardware, but also not rely on the use of operating system tables that may not be working. In addition, if one debugger selected as the preferred debugger is not available at the time of an exception condition, a second debugger may be invoked in its place. Later, when the preferred debugger becomes available, the programmer may wish to continue the debugging session by switching to the preferred debugger without losing the current machine state.

Thus, at any given moment one may wish to select for use a subset of debuggers from among a variety of debuggers, each having a particular set of capabilities. However, existing debugger technology has heretofore permitted only one debugger at a time to be operative on a single running program in the machine. As used in this discussion, the word "operative" is used to mean that any of following is true:

1) that the debugger may be entered due to a programmed condition, such as a "hardcoded" break instruction, without any further human intervention and without any process, with which the debugger is associated, being the "active" process at the time that the programmed condition is encountered;

2) that a human operator previously utilized the debugger to establish a debugging state (e.g., active execution breaks) which, when matched by the machine state, causes the debugger to be entered and control returned to the human operator, regardless of whether or not the debugging state occurred at a time when a process associated with the debugger was active; or 3) that the debugger is currently interacting with a human operator and the program's execution.

For example, on computers that include special hardware for providing a memory protection feature, the absence of any means for multiplexing this hardware prevents more than one debugger from being active at a time. Furthermore, the inability to multiplex hardware control or register modification in a deterministic way prevents current multiple-debugger environments from debugging an operating system that would otherwise be responsible for maintaining the state of a running process. Consequently, problems arising in the field may be more difficult to debug because of the inability to switch, at the instant that a program "crash" is encountered, from a first debugger to a second debugger with different abilities without first exiting the first debugger, thereby changing the state of the machine.

Some prior art operating systems, such as the UNIX operating system, include certain debugging capabilities that allow multiple user level debuggers to appear to operate concurrently, although not for the purpose of debugging the same running program. As descrj. bed, for example, in "A/UX Programmer's Reference, Sections 2 and 3(A–L)", published by Apple Computer, Inc. in 1990, a process trace ("ptrace") command is provided that gives a parent process a means for controlling the execution of a child process. This is most useful for implementing breakpoint debugging. In this instance, the parent process is a debugger program, and the child process is the program being debugged. The child process behaves normally until it encounters a predefined signal, at which time it enters a stopped state and its parent is notified. When the child is in the stopped state, its parent (i.e., the debugger program) can use ptrace to examine and modify the child's "core image". Thus, the ptrace command provides: a way for a debugger program to gain access to the child's state information that is being stored in the UNIX operating system resources.

However, in this environment the user cannot use a first debugger (parent process) to debug the child process up to a certain point and then switch to a second debugger that provides a different set of debugging capabilities because there is no mechanism for the second debugger to access the first debugger's child process. Consequently, even though the UNIX operating system is a time-sharing system that allows multiple debugger programs to appear to run concurrently, the system lacks any centralized means for controlling the debugging of one process by multiple debuggers. As a result, each running process in the system is only capable of invoking a single debugger (i.e., its parent process).

A corollary of the decentralized nature of debugging control in UNIX is that portability of each of the individual debuggers is limited, because each must have intimate knowledge of the workings of the particular processor upon which the system is built in order to implement standard debugger features. For example, while the ptrace command is useful for the implementation of breakpoint debugging, the command does not, itself, provide any facility for setting or removing a breakpoint. Instead, each individual debugger running under UNIX must use multiple calls to the ptrace command in order to first retrieve a copy of a child process instruction (referred to here as an "original instruction") that presently occupies a desired breakpoint location, and then to store into that breakpoint location a signal instructLion. The particular signal instruction must be selected by the person who writes the debugger program so as to cause, when the signal instruction is executed, the child process to be suspended and the parent (debugger) process invoked. When it is desired to resume execution of the child process, the debugger must further be responsible for ensuring that the original child instruction (that was replaced. by the signal instruction) gets executed, and that the currently desired set of signal instructions are again in place before execution of the child process is resumed.

Any debugger that is implemented by means of the UNIX ptrace mechanism has the further drawback of being incapable of following a line of program execution into the UNIX kernel to debug problems there. This is because a process-based environment (i.e., one in which the actual running of a process is scheduled by an operating system kernel) is a necessary component of any debugging system that is built around the ptrace function. Since the UNIX kernel is not, itself, associated with a process, it follows that it cannot be a child process of a debugger.

In addition to the need and/or preference to have concurrently operative debuggers of varying levels, the need to have more than one debugger capable of responding to any given machine state condition can arise if a particular debugger cannot be accessed. This can happen in the case of a two machine debugger which requires that a second processor, which runs debugger software, be coupled to the computer that is running the software to be debugged. If the second processor is not attached, then the execution of any programmed breakpoints associated with the two machine debugger would cause unpredictable results. It would be preferable, in such a case, to have the computer default to a lower level debugger in response to the breakpoint condition, so that the state of the computer (which contains valuable information for determining why the breakpoint was executed) would not be lost.

Thus, it is desirable to provide a program debugging system that is capable of having more than one debugger operative at a time.

SUMMARY

In accordance with one aspect of the invention, the foregoing and other objects are achieved in a program debugging system having a debugger core unit, comprising a plurality of debugger memory areas, each exclusively associated with a corresponding one of a plurality of debuggers. In response to a program exception, the debugger core unit selects one debugger from the plurality of debuggers, the selection being made by determining which one of the plurality of debuggers is associated with the program exception. Then, computer state information and debugger state information are stored into a selected one of the plurality of debugger memory areas, the selected debugger memory area being uniquely associated with the selected debugger. The selected debugger is then activated.

In accordance with another aspect of the invention, the system may accommodate a new debugger by providing a mechanism for the new debugger to register with the debugger core unit. The new debugger is then added to the plurality of debuggers.

In yet another aspect of the invention, a selected. debugger, once activated, may send debugging commands to the debugger core unit. The debugger core unit receives the command, and in response thereto, updates debugger state information based on the received debugging command, and stores the updated debugger state information into the selected debugger memory area.

In still another aspect of the invention, the debugger core unit controls a hardware resource in accordance with the received debugging command. This may be performed as a two-step process, in which the debugger core unit first updates the debugger state information in correspondence with the requested command, and then retrieves the updated debugger state information from the selected debugger memory area, and controls the hardware resource in accordance therewith. The updated debugger state information may include an indication that a breakpoint is set at a memory location. In this case, the debugging system will control the hardware resource by setting a breakpoint that includes information associating the set breakpoint with the selected debugger. The breakpoint may be, for example, an execution breakpoint, a memory access breakpoint, or a memory modification breakpoint.

In yet another aspect of the invention, a command from the selected debugger to set a breakpoint merely results in the debugger state information being updated to include the indication that a breakpoint is set. Only when the debugger relinquishes control of the computer does the debugger core unit actually control the computer hardware to set the breakpoint. Because the set breakpoint includes information associating it with the selected debugger, the debugger core unit will be able to determine which debugger to activate when the breakpoint is triggered.

In accordance with another aspect of the invention, the selecting means within the debugger core unit includes means for selecting a default debugger from the plurality of debuggers. A default debugger may be designated as part of the initial program load (IPL) of the operating system. The designated default debugger may then be selected and activated in response to a request made by a running program. Such a request might be made, for example, in response to an unanticipated program error condition.

In accordance with yet another aspect of the invention, the selecting means further comprises means for alternatively outputting as the selected debugger a user preferred one of the plurality of debuggers, and if no user preferred one of the plurality of debuggers exists, then the selected default debugger. In this way, a user of the program may override the default selection, and thereby cause a different one of the plurality of debuggers to be activated in response to the running program's request,

BRIEF DESCRIPTION OF THE DRAWINGS

These and other aspects of the invention will be understood by reading the following detailed description in conjunction with the drawings in which:

FIG. 1 is a high level block diagram of a program debugging system in accordance with the present invention;

FIGS. 2a–2b show the flow of control during debugging in accordance with the present invention;

FIG. 3 is a flow diagram showing the actions that take place in response to a breakpoint hardware exception in accordance with the present invention;

FIG. 4 is a flow diagram showing the actions that take place when an active debugger examines a particular memory location in accordance with the present invention;

FIG. 5 is a flow diagram showing the actions that take place when an active debugger sets or clears an execution or modification or access breakpoint and then resumes execution of the program in accordance with the present invention;

FIG. 6 is a flow diagram showing an example of non-breakpoint invocation of a debugger in accordance with the present invention;

FIGS. 7a–7i are flow diagrams illustrating the flow of control when one debugger is used for debugging a second debugger in accordance with the present invention; and FIGS. 8a–8b are flow diagrams illustrating the operation of a default debugger feature in accordance with the present invention.

DETAILED DESCRIPTION

The following description sometimes portrays the various features of the inventive debugging system in terms that include program listings, and the like. This is done for the purpose of facilitating an understanding of the invention.. However, it should be remembered that the invention is not the program listing itself, but rather the various techniques and electrical signals, represented by the program listing, for controlling the operation of physical computer hardware.

Referring now to FIG. 1, a high level block diagram of a program debugging system 100 in accordance with the present invention is shown. The debugging hardware 105 comprises the various hardware resourcels, such as program counter, addressable memory, registers, and memory protection system that need to be manipulated during debugging operations. The exact composition of the debugging hardware 105 will depend on the particular computer upon which the debugging system is to run. For the purposes of this discussion, it will be assumed that the debugging hardware 105 represents the entire hardware environment made available by the PowerPC model 601 microprocessor, manufactured by IBM Corp. and Motorola Corp. However, those having ordinary skill in the art will readily be able to adapt the invention to serve any general purpose computer, based on the description provided here.

An important aspect of the invention is the fact that the debugging system organization divides the overall debugging operation into a set of user interface units that are all coupled to a single debugger core unit that performs primitive debugging operations on behalf of the user interface units. The debugger core unit is preferably implemented as a computer program that is stored in, and executed by the debugging hardware 105 itself. In addition, the user interface functions may be implemented as computer programs which are alternatively entirely stored in and executed by the debugging hardware 105, or which may, in the case of a two machine debugger, have only a portion of the computer program (called a "nub") stored in and executed by the debugging hardware 105, the remainder of the program being stored in and executed by a second processor unit (not shown).

The user interface functions are represented in FIG. 1 as the plurality of debuggers 101-1 . . . 101-N. Each of the debuggers 101-1 . . . 101-N presents a particular set of debugging features (such as single step control, high level source code debugging, etc.) to the user (not shown). Although it is by no means a requirement of the system, it is advantageous for each of the debuggers 101-1 . . . 101-N to provide debugging features that differ from one another, and that are based on different assumptions concerning which operating system features they can depend on. Consequently, the set of debuggers 101-1 . . . 101-N can be selected so that an appropriate debugging tool can be made available to a user under a wide variety of debugging circumstances and environments.

Since the debugging hardware 105 does not include any provisions for allowing each of the debuggers 101-1 . . . 101-N to directly manipulate the hardware without either conflicting with one another or building ad hoc relationships among the various debuggers 101-1 . . . 101-N (so that each of the debuggers 101-1 . . . 101-N would have to be aware of the operation of each of the others), each of the debuggers 101-1 . . . 101-N converts each of its debugging features into one or more primitive debugging commands which are supplied to the debugger core unit 103. The function of the debugger core unit 103, then, is to interact with the debugging hardware 105 as requested by the various debuggers 101-1 . . . 101-N in order to carry out the requested primitive debugging operations in a manner permitting each of the debuggers 101-1 . . . 101-N to run independently of one another.

Typically, only one of the debuggers 101-1 . . . 101-N will be in use at any one time. However, this is not a requirement. Thus, the inventive architecture depicted in FIG. 1 permits, for example, debugger$_1$ 101-1 to debug debugger$_2$ 101-2, or any of the remaining debuggers 101-2 . . . 101-N.

In accordance with a preferred embodiment of the invention, a set of primitive debugging operations that are supported by the debugger core unit 103 includes:

Register new debugger: This primitive allows any of the debuggers 101-1 . . . 101-N to supply the debugger core unit 103 with a program entry point into the debugger that should be called whenever any of a predetermined number of exception conditions (described below) is signalled by the debugging hardware 105. Once a debugger 101-1 . . . 101-N has registered its entry point with the debugger core unit 103, that debugger is considered "operative" because it may, at some point, become active (i.e., have the debugger core unit 103 make a subroutine call to that debugger's entry point).

Set Execution Breakpoint: This primitive causes the debugger core unit 103 to set a breakpoint at a particular address space location (alternatively mapped or unmapped) in the software that is being debugged. The breakpoint is executed when the computer attempts to execute an instruction from the location being occupied by the execution breakpoint.

Set Access Breakpoint: This primitive causes the debugger core unit 103 to set a breakpoint that will be executed when a read or write operation to the memory occurs at a breakpoint-specified effective address for a breakpoint-specified number of bytes.

Set Modification Breakpoint: This primitive causes the debugger core unit 103 to set a breakpoint that will be executed when a write operation to the memory occurs at a breakpointspecified effective address for a breakpointspecified number of bytes.

List Breakpoints: This primitive causes the debugger core unit 103 to provide a list of all set breakpoints to the human operator, via an active debugger. In the preferred embodiment, only those breakpoints that were set by the active debugger are listed.

Clear Execution Breakpoint: This primitive causes the debugger core unit 103 to clear a previously set execution breakpoint at a particular address space location (alternatively mapped or unmapped) in the software that is being debugged.

Clear Access Breakpoint: This primitive causes the debugger core unit 103 to clear a previously set access breakpoint.

Clear Modification Breakpoint: This primitive causes the debugger core unit 103 to clear a previously set modification breakpoint.

Single Step: This primitive causes the debugger core unit 103 to allow the program being debugged to execute one instruction. Execution of this program is then halted, and control of the computer is returned to the active debugger.

Read/Write Register: This primitive allows the active debugger to read and/or modify a register value.

Read/Write Memory: This primitive allows the active debugger to read and/or modify a particular memory location.

Resume Program Execution: This primitive allows a debugger to become inactive (but still registered) while the program being debugged resumes execution.

In addition to the above primitives, which allow any of the debuggers 101-1 . . . 101-N to receive service from the debugger core unit 103, the debugger core unit 103 also supports preprogrammed breakpoints. These are primitives that the program under test will call in order to activate a specific debugger., or alternatively, to activate a debugger that has been predefined within the program debugging system 100 as the "default debugger". In the preferred embodiment, preprogrammed breakpoints are implemented by encoding unused fields within the PowerPC's TWI instruction to indicate the type of breakpoint as well as the identity of the desired debugger. This is described in more detail below.

The flow of control during debugging will now be illustrated with reference to FIG. 2a. The debugger 201 may be any of the debuggers 101-1 . . . 101-N shown in FIG. 1. The debugger core unit 103 and debugging hardware 105 are the same as those illustrated with like reference characters in FIG. 1.

The debugger core unit 103 is preferably event-driven. That is, substantially all of its actions are made in response to corresponding externally generated events.

Referring now to FIG. 2a, event 1 corresponds to the occurrence of an exception, which in the preferred embodiment is a PowerPC interrupt. In a typical case, this interrupt will be the result of a breakpoint (either user set, execution, access, or single step). In response, the debugger core unit 103 disables further interrupts, and then examines the breakpoint that caused the interrupt. Information encoded in the breakpoint indicates which of the debuggers the breakpoint is associated with. In this example, the breakpoint is associated with the debugger 201.

Next, event 2 corresponds to an invocation of the debugger 201 by the debugger core unit 103, thereby making the debugger 201 "active". In the preferred embodiment, this is a normal subroutine call to the entry point that was previously registered by the debugger 201 by means of the "Register New Debugger" primitive. The subroutine call to the debugger 201 passes parameters that tell the debugger 201 the reason for the exception. Also passed with this subroutine call is a parameter called "debuggerCoreState," which the debugger 201 must return to the debugger core unit 103 each time a request for service is made. In the preferred embodiment, "debuggerCoreState" is a data structure that includes the pointer, "DebuggerVars" that provides access to a memory area that is exclusively associated with the debugger 201. Into the DebuggerVars memory area is stored computer and debugger state information, as will be explained in further detail below. The "debuggerCoreState" variable also preferably includes other data owned by the debugger 201, such as the address of its entry point.

Events 3 correspond to various requests for and responses to primitive service made by the debugger 201 while it is active (i.e., before the debugger 201 has performed a return from its entry point subroutine, relinquishing control back to the debugger core unit 103). These requests for primitive service may, for example, include requests to have the debugger core unit 103 set breakpoints, access memory, or alter the state of the running process. In response to certain requests for access to hardware components, such as memory read requests, the debugger core unit 103 will immediately manipulatse the debugging hardware 105 as required (event 3'), and return any operation results back to the debugger 201. The remaining operations, such as requests to modify processor registers or to modify breakpoints, are not immediately carried out on the debugging hardware 105, but instead result in corresponding changes to the saved computer and debugger state located in the debugger vars area described above. Application of these state changes to the debugging hardware 105 is delayed until the user 207 resumes execution of the program (see event 5, below).

The debugger core unit 103 is also responsible for maintaining the current state of each of the debuggers 101-1 . . . 101-N. Thus, in our example, primitive operations that cause a corresponding change to the state of the debugger 201 will cause the debugger core unit 103 to update the debuggerCoreState variable that the debugger 201 passes to the debugger core unit 103 with every primitive service request.

During the time that the debugger 201 is active, it is also free to communicate with the user 207 (event 3"), which may be a human operator. However, because interrupts were previously disabled (event 1), inputting data from the user 207 is preferably made via polled input/output (I/O).

Eventually, the user 207 will want to resume execution either by single stepping or by continuing execution (possibly with the expectation that control will be returned after the next breakpoint is encountered). As indicated above (event 2), the debugger 201 was activated by means of a subroutine call. Consequently, at event 4, the debugger 201 returns control to the debugger core unit 103 by executing a return from subroutine instruction that also passes variables that indicate the desired next action, and a single step count (if pertinent to the desired next action). The single step count instructs the debugger core unit 103 how many instructions should be executed before the debugger is to be reentered. This feature may be implemented as a variable that is initialized to the requested single step count, and then decremented as each instruction is executed. So long as the count is greater than zero, the debugger core unit 103 simply returns control to the program being debugged for execution of another instruction. When the count reaches zero, the debugger 201 is again activated. Those skilled in the art will recognize that the single step count feature permits a debugger to single step through each line of a high level language program by setting the single step count equal to the number of low level instructions that actually carry out the high level instruction.

After resuming control, the debugger core unit 103 will plant any requested breakpoints and exit from the interrupt routine (event 5), thereby resuming execution of the program that was running at the time of the initial exception (event 1). If a single step operation is to be the next action, then the action of the debugger core unit 103 depends on the environment in which it is running. If the debugging hardware 105 includes a single step hardware function, such as might be found in the Motorola 680×0 family of processors (not shown), then the debugger core unit 103 must ensure that this hardware is properly initialized before relinquishing control. However, if such single step hardware is not available, as is the case in the exemplary embodiment, then the debugger core unit 103 itself manages the single step operation by first using a prediction routine (described below) to determine the memory location of the instruction immediately subsequent to the next instruction to be executed, and then setting a single step breakpoint at that location. The determination of this "next next instruction" is made from an analysis of the current state of the debugging hardware 105, as reflected in the machine state information located in a debugger vars memory area associated with the debugger 201 (accessed by means of the variable "DebuggerVars").

The flow of control during debugging has been illustrated under the assumption that each of the debuggers 201 is a one-machine debugger (i.e., that it runs entirely on the same hardware as the program to be debugged). This is not a requirement, however. FIG. 2b illustrates the flow of control during debugging when the debugger 201 comprises two distinct parts, identified as a debugger nub 201a and a debugger main 201b.

The debugger nub 201a resides and executes on the debugger hardware 105 that is physically located within a first computer 209. The software to be debugged also resides within the first computer 209.

The debugger main 201b is located within and executed by a second computer 211. Means for communicating between the first computer 209 and the second computer 211 must be provided.

The operation of the debugger core unit 103 in this embodiment is identical to that which was described above with respect to the one machine debugger 201 (see FIG. 2a). Thus, events 1, 2, 3, 3', 3", 4 and 5 are the same as previously described. The only change required by the two-machine debugger 201a, 201b is the fact that each of the events 2, 3, 4 that occur between the debugger nub 201a and the debugger core unit 103 is converted into corresponding events 2',3",4' that occur between the debugger nub 201a and the debugger main 201b.

The important features of the present invention will now be described in more detail by means of a pseudocode listing that appears at the end of this description. Those skilled in the art will recognize that such a format presents a structured description of the corresponding program modules in a readily understandable English-like language which is not readily suitable for use or compilation by any particular computer. However, the structured format of the pseudocode facilitates its conversion into a suitable program for execution on a computer, which in the preferred embodiment is a PowerPC model 601 microprocessor.

To further facilitate a better understanding of the invention, the operation of the above-identified key program modules and others will be described in the context of several examples.

Referring now to FIG. 3, the actions that take place in response to a breakpoint hardware exception will now be described. This corresponds to events 1 and 2 in FIGS. 2a and 2b. Reference numeral 301 represents the occurrence of a breakpoint hardware exception while running a program to be debugged (not shown). In the preferred embodiment, which utilizes a PowerPC microprocessor, the breakpoint hardware exception 301 is caused by execution of an instruction called Trap Immediate (assembly language mnemonic "TWI"). Although this instruction may, in principle, be coded to cause a trap only if a particular condition is satisfied, the present invention uses the unconditional form of the instruction (i.e., "TWI 31, R0, Immediate_Value"), so that a trap will occur regardless of the values in R0 or Immediate_Value. A code, indicating breakpoint type as well as the identity of the particular debugger with which the breakpoint is associated, is placed in an unused field of the TWI instruction (i.e., the field is unused by the hardware that executes this form of the TWI instruction, and can therefore be set to any value without changing the operation of instruction execution). It is well known that such an instruction will cause the computer hardware to generate an interrupt that causes the next instruction to be fetched from a predefined memory location. Similar instructions that are not fully encoded and which cause particular interrupts to occur when executed (e.g., so called "illegal instructions") exist as well in computer architectures other than the PowerPC architecture, so that the present invention is by no means limited to the present embodiment.

In accordance with the present invention, the predefined memory location from which the next instruction is fetched after the occurrence of the breakpoint hardware exception 301 includes program code that causes an entry into the ProgramExceptionEntry routine 303. As indicated in the figure, this routine examines the variables associated with the breakpoint in order to determine which of the debuggers 101-1 . . . 101-N to use. For the purposes of this example, it will be assumed that the breakpoint was originally set by debugger$_2$ 101-2. Then, the ProgramExceptionEntry routine 303 saves the current state of the computer into a memory area, "DebuggerVars", that is uniquely associated with debugger$_2$. In the preferred embodiment, the variable "DebuggerVars" is a pointer to the start of a computer and debugger state information save area, which is referred to throughout this description as a "debugger vars" area. Those having ordinary skill in the art will recognize that having DebuggerVars be a pointer variable is only one of a number of possible ways of implementing this feature.

Next, the ProgramExceptionEntry routine 303 performs a subroutine call to the DebuggerCoreEntry routine 305, which is located in the DebuggerCoreEntry.cp program module. The DebuggerCoreEntry routine 305, which is the main routine of the debugger core unit 103, will clean up the executing environment by removing any breakpoints associated with the selected debugger (in this case, debugger$_2$ 101-2), and replacing these with the data that was originally stored at these memory locations. This process of removing a breakpoint and substituting therefor the original data is called "pulling" the breakpoint. The purpose of pulling these breakpoints from the program's memory area is to enable the user to view the original data stored in the memory. The existence of these breakpoints is not removed, however, but is instead retained in the debugger vars area, so that they can later be restored (referred to in this discussion as "planting the breakpoints") upon resuming program execution. The DebuggerCoreEntry routine 305 is also responsible for saving the interrupt state prior to single stepping. This is necessary in the preferred embodiment because single stepping is performed with interrupts turned off in order to create a stable debugging environment. When normal execution is to be resumed, the saved interrupt state is restored. The DebuggerCoreEntry routine 305 also saves any existing single step breaks (described below), and a flag ("SteppingOff") that indicates the fact that an execution break is being processed (described in greater detail below). Then, the DebuggerCoreEntry routine 305 makes a subroutine call to the entry point of debugger$_2$ 101-2 (supplied to the debugger core unit 103 by a previously executed "Register New Debugger" primitive). As illustrated in FIG. 3, the interface 307 between the DebuggerCoreEntry routine 305 and the debugger$_2$ 101-2 is defined in the DebuggerCore.h program module. This interface comprises a set of variables which are passed to the debugger$_2$ 101-2 telling it which breakpoint was encountered and what the present state of the computer is. The interface 307 also includes a variable (not shown) that will be passed, upon execution of a return from subroutine instruction, from the debugger$_2$ 101-2 to the DebuggerCoreEntry routine 305, indicating how program execution is to resume (e.g., single step, run mode, etc.).

Referring now to FIG. 4, the actions that take place when an active debugger wants to examine a particular memory location will now be described. This would take place at a time corresponding to event 3 in FIGS. 2a and 2b. It will be assumed, for the sake of this example, that the active debugger is debugger$_2$ 101-2. The debugger$_2$ 101-2 utilizes an interface 401 to indicate to the debugger core unit 103 that a memory read operation is to take place. In the preferred embodiment, the debugger$_2$ 101-2 directly calls any one of a number of memory access routines, such as the routine entitled Dc_GetByteByEffectiveAddress. (The memory access routines are located in the DebuggerCoreMemoryAccess.cp module that is part of the debugger core unit 103.) Because the operating system (OS) memory management system 405 may, itself, be under development, the debugger core unit 103 has its own memory mapping system that it uses whenever it has enough information. This memory mapping system preferably provides mappings at least for the debugger core unit 103, the resident operating system (not shown), and key input/output (I/O) routines (not shown). Consequently, in response to the request made by the debugger$_2$ 101-2, a memory read routine 403 located in the DebuggerCoreMemoryAccess.cp module tries to use just the information contained in the variable DebuggerVars 407 associated with the debugger$_2$ 101-2 in an attempt to map the requested effective address into a physical address. Should this fail, however, then the memory read routine 403 will ask the OS memory management system 405 to perform the address translation. After the effective address has been translated into a physical address, the memory read routine 403 reads the requested memory location, and returns the retrieved value to the debugger$_2$ 101-2 by means of the interface 401.

Referring now to FIG. 5, the actions that are associated with several breakpoint operations will now be described. It will again be assumed, for the sake of this example, that the active debugger is debugger$_2$ 101-2. Four breakpoint operations are possible: Set, Clear, Plant and Pull. As was indicated previously, the debugger core unit 103 does not actually plant a breakpoint at the time that such breakpoint request is made by the debugger$_2$ 101-2. Instead, the debugger core unit 103 remembers that the breakpoint operation was requested, and then actually plants the breakpoint only after the debuggent$_2$ 101-2 has returned control of the computer to the debugger core unit 103. This is illustrated in FIG. 5 by the fact that the debugger$_2$ 101-2 uses the interface 501 defined in the DebuggerCore.h program module to invoke breakpoint service routines 503 located in the DebuggerCoreServices.cp program module. These breakpoint service routines 503 provide the ability for the debugger$_2$ 101-2 to obtain a list of all of the breakpoints that it has set. The breakpoint service routines also allow the debugger$_2$ 101-2 to Set and/or Clear breakpoints. However, it must be recognized that the Set and Clear breakpoint operations merely insert and remove, respectively, an indication in a breakpoint Database that the particular breakpoint has been requested. Each of these operations, then, occurs at a time corresponding to event 3 in FIGS. 2a and 2b.

By contrast, the actual insertion and removal of breakpoints into particular program memory locations is performed, respectively, by the Plant routine 509 and the Pull routine 511, both of which are located in the DebuggerCoreRestart.cp program module 505. The Plant routine is invoked only after the debugger$_2$ 101-2 has performed a return from subroutine instruction 507 (corresponding to event 4 in FIGS. 2a and 2b) to return control of the computer to the debugger core unit 103. The return from subroutine 507 relinquishes control of the computer back to the DebuggerCoreEntry routine 305, which in turn calls the Plant routine 509, which actually modifies the debugging hardware or memory with the breakpoints. As shown by line 513, the Pull routine 511 is invoked by the DebuggerCoreEntry routine 305 just before activating the debugger$_2$ 101-2 (see FIG. 3). The operation of the Plant and Pull routines 509, 511 is determined by the state of the breakpoint Database that was established by the now-inactive debugger$_2$ 101-2.

Certain non-breakpoint conditions will also cause one of the debuggers 101-1 . . . 101-N to be invoked. For example, an invocation of a debugger may be made in response to a memory reference that cannot be resolved, or by the occurrence of a non-maskable interrupt (NMI) breakpoint. The identification of which debugger to invoke under these circumstances is an implementation-dependent concern.

An example of non-breakpoint invocation of a debugger is shown in FIG. 6. Processing starts with the occurrence, at step 601, of a non-breakpoint hardware exception during execution of a program. In response, the computer hardware and/or operating system itself saves enough of the state of the computer (step 603) to permit normal exception processing 607 to take place. Although step 603 could, in principle, encompass saving the entire state of the computer, the large amount of data required to fully represent the state of a reduced instruction set computer (RISC) architecture (such as the PowerPC microprocessor utilized in the preferred embodiment) makes such an approach excessively burdensome for normal exception processing.

Next, at step 605, the cause of the hardware exception is examined to determine whether or not a debugger should be activated. If no debugger is to be activated, as would be the case for example if the hardware exception is merely an I/O exception, then the flow of processing proceeds to step 607, where appropriate exception processing for this hardware exception is performed. A complete description of such conventional exception processing is beyond the scope of this invention, and is not presented here. At the conclusion of this processing, the complete state of the computer is restored at step 615, and the hardware exception routine returns, at step 617, to the interrupted program.

Returning to step 605, if it is determined that a debugger should be activated, then processing continues at step 606. The system may be designed, for example, to activate a debugger in response to the occurrence of an NMI or non-resolvable memory reference exception. At step 606, the full state of the machine is saved in a way that captures the state of the machine as it existed upon entry (step 601) into the non-breakpoint hardware exception routine. Next, at step 609, one of the plurality of debuggers is selected on the basis of what the source of this hardware exception was (e.g., NMI versus nonresolvable memory reference exception). The particular selection is an implementation specific determination.

Next, at step 611, the machine state information that was previously saved at step 606 is copied into a debugger vars area that is exclusively associated with the debugger selected in step 609. An example of the processing of 609 and 611 is included in the pseudocode module DoException.cp, which appears at the end of this description.

It is noted that the processing that occurs in steps 609 and 611 is analogous to the processing that is performed by the ProgramExceptionEntry routine 303. Consequently, at step 613, a direct call to the DebuggerCoreEntry routine 305 is made, without the need for ever invoking the ProgramExceptionEntry routine 303 during non-breakpoint exception processing. The DebuggerCoreEntry routine 305 activates the selected debugger in the manner described above with respect to FIG. 3.

After the user has finished the debugging session, the DebuggerCoreEntry routine 305 performs a return from subroutine, so that step 615 is executed. At step 615, the previously saved machine state is restored, and the hardware exception routine returns, at step 617, to the interrupted program.

The final example, which illustrates the debugging system capability of using one debugger to debug a second debugger, is useful for describing how the debugger core unit 103 implements and uses reentrancy in accordance with the present invention. This aspect of the present invention will be described with reference to FIGS. 7a–7i.

Referring now to FIG. 7a, it will be assumed, for this scenario that debugger$_x$ 101-X is under development. It will be assumed further that one of the intended functions of debugger$_x$ 101-X, referred to throughout this description as Function A, is believed to have a problem that requires debugging.

In this example, a hard coded program break 701 has been encountered, for example, as part of the initial program load (IPL) of the computer operating system. This is preferably implemented by having the operating system make a subroutine call to a startup routine within the debugger core unit 103, the startup routine having therein the hard coded program break 701.

In response to the occurrence of the program break, the ProgramExceptionEntry routine of the debugger core unit 103 is invoked at step 703. The ProgramExceptionEntry routine decodes the exception as a program break that is handled by the debugger$_1$, 101-1, and saves the machine state in the debugger$_1$ vars area 706 (called DebuggerVars in the program listing). Consequently, in step 705, the DebuggerCoreEntry routine performs all necessary steps in preparation for invocation of debugger$_1$ 101-1, including analyzing the breakpoint instruction to determine the type of breakpoint that was encountered. Then the DebuggerCoreEntry routine makes a subroutine call to the entry routine of debugger$_1$ 101-1 (debugger$_1$ 101-1 has previously registered its entry point with the debugger core unit 103). It will be recognized that, as before, the interface 707 between the DebuggerCoreEntry 10 routine and the debugger$_1$ 101-1 is defined in the DebuggerCore.h program module. Once it is invoked, the debugger$_1$ 101-1 may create an appropriate user display on, for example, a video display terminal (VDT), for communication with the user 709.

Next, in FIG. 7b, the debugger$_1$ 101-1 is instructed by its user 709 to set a breakpoint at location "A" within debugger$_x$ 101-X. Since, from the point of view of debugger$_1$ 101-1, debugger$_x$ 101-X is just another program, this is easily accomplished by calling upon the debugger core unit 103 to execute a SetBreakPoint primitive 711, as described above with respect to FIG. 5. Successful completion of the SetBreakPoint primitive causes a breakpoint indication for location "A" to be placed in the breakpoint database that is associated with debugger$_1$ (i.e., the debugger$_1$ vars area), and a good return code (not shown) to be returned to the debugger$_1$ 101-1. Because each debugger can see only its own breakpoints, this information is logically a part of the state of debugger$_1$ 101-1, and is therefore retained in the debugger$_1$ vars area 706.

Turning now to FIG. 7c, the user 709 enters a "go" command to debugger$_1$ 101-1. Debugger$_1$ 101-1 returns from the subroutine call (step 705) with a returned parameter ("next action") indicating that the execution of the program being debugged should be continued. In response, the DebuggerCoreEntry routine (step 713) modifies the return address, stored in the debugger$_1$ vars area 706, to skip the Programmed Break instruction 701 (FIG. 7a). The DebuggerCoreEntry routine then plants all of the currently set breakpoints belonging to debugger$_1$ 101-1, which in this example is simply the one breakpoint at location "A" in debugger$_x$ 101-X. The DebuggerCoreEntry routine then exits to the ProgramExceptionEntry routine (step 715). Next, the machine state is restored. As part of restoring the machine state, the ProgramExceptionEntry routine picks up the modified return address from the debugger$_1$ vars area 706, and uses this address to resume execution of the program at the instruction following the Programmed Break instruction.

The description of this example continues with reference to FIG. 7d, where in step 717, a second Programmed Break instruction is encountered within the debugger$_x$ 101-X program. In step 719, the ProgramExceptionEntry routine decodes the exception as a program break that is handled by debugger$_x$ 101-X, and saves the machine state in the debugger$_x$ vars area 723. Consequently, the DebuggerCoreEntry routine is invoked (step 721), which results in debugger$_x$ 101-X being activated. The debugger$_x$ 101-X may create an appropriate user display on, for example, the VDT (not shown), for communication with the user 709.

As an alternative to the scenario in FIG. 7d, debugger$_x$ 101-X might also be activated by means of an NMI condition generated by some external condition, such as depression of a button or key sequence that causes an NMI interrupt.

Referring to FIG. 7e, the debugger$_x$ 101-X is now active, with a debugger$_1$ breakpoint set at location "A". The user 709 instructs the debugger$_x$ 101-X to set a debugger$_x$ breakpoint at location "B" in some program code 725 that is not part of debugger$_x$'s own program. The debugger$_x$ 101-X responds as previously described with respect to FIG. 5, and an indication that a trap should be set at location "B" is recorded in the breakpoint database that is associated with debugger$_x$. This information is logically a part of the state of debugger$_x$ 101-X, and is therefore retained in the debugger$_x$ vars area 723. The next event that occurs in this example happens when the user 709 instructs the debugger$_x$ 101-X to perform some function that results in a call to location "A".

As illustrated in FIG. 7f, the call to location "A" causes the debugger$_1$ breakpoint at location "A" to be hit (step 727). This, in turn, causes the debugger core's ProgramExceptionEntry routine to be invoked (step 729). The ProgramExceptionEntry routine determines that the reason for the exception is the debugger$_1$ breakpoint. Consequently, it saves the machine state (in this case, the state of debugger$_x$ 101-X) in the debugger$_1$ vars area 706. Next, the DebuggerCoreEntry routine is called (step 731). After pulling all of debugger$_1$'s breakpoints, the DebuggerCoreEntry routine calls the debugger$_1$ entry point. Debugger$_1$ 101-1 displays an appropriate message to the user 709, to indicate that it has been invoked. At this point, debugger$_1$ 101-1 is debugging the state of the machine as it existed upon the call to function A. This state includes the fact that function A was called during execution of debugger$_x$ 101-X, which was activated as a result of an exception condition (step 717). The state of the machine at the time of this exception condition is still preserved in the debugger$_x$ vars area 723.

Continuing the discussion with reference to FIG. 7g, the user 709 has decided to resume execution of the debugger$_x$ program, beginning at location "A", while retaining the breakpoint at location "A" (see debugger$_1$ vars area 706). The debugger$_1$ 101-1 responds by returning control to the DebuggerCoreEntry routine (step 733) with a next action parameter indicating the "continue" function. The DebuggerCoreEntry routine then invokes the RestartTarget routine (step 735) to handle this request. Because an execution breakpoint was previously substituted for the original instruction at location "A" in the debugger$_x$ program, that original instruction was never executed. Thus, before allowing the debugger$_x$ program to begin running., it is necessary to execute the original instruction at location "A" (this instruction was previously restored to location "A" when all of the breakpoints for debugger$_1$ were pulled upon activation of debugger$_1$), perform a single step operation at location "A", and then again substitute the requested execution breakpoint for the original instruction at location. "A". However, in the exemplary embodiment of the invention, the computer hardware does not directly support a single-step function. Consequently, the debugger core unit 103 itself implements the single step function, by means of single step breakpoints. The RestartTarget routine determines the location of the instruction following the instruction originally located at address "A". If it is assumed, for the sake of this example, that the length of the instruction originally located at address "A" is 4 bytes and that the instruction located at address "A" does not change the flow of control, then the following instruction should begin at location A+4. A single step breakpoint is planted at this location, and the SteppingOff internal flag associated with debugger$_1$ 101-1 (there is a corresponding SteppingOff flag stored in each debugger's vars area) is set in order to first let the RestartTarget routine know that an execution breakpoint is being processed. Of importance is the fact that the RestartTarget routine does not replant the breakpoint at location "A". This allows the original instruction at "A" to execute.

The RestartTarget routine then returns to the DebuggerCoreEntry routine, which itself returns to the ProgramExceptionEntry routine (step 737). When the ProgramExceptionEntry routine exits, program execution resumes at location "A" (step 739).

Referring now to FIG. 7h, after executing the instruction at location "A", the single step breakpoint is encountered at location A+4 (step 741). Once again, the ProgramExceptionEntry routine is entered (step 743). This routine decodes the breakpoint instruction as being a single step breakpoint associated with debugger$_1$ 101-1, and then invokes the DebuggerCoreEntry routine (step 745).

The DebuggerCoreEntry routine recognizes, from the "set" state of this debugger's SteppingOff internal flag, that this single step operation was not the user's intention, but rather was performed merely to create an opportunity to place an execution breakpoint at location "A" immediately after executing the instruction at this location. Because there is no need to communicate with the user 709 (by means of debugger$_1$ 101-1), the DebuggerCoreEntry routine handles this situation directly by removing the single step trap from location "A+4", turning off debugger$_1$'s SteppingOff flag, and then re-planting the execution trap at location "A". After the DebuggerCoreEntry and ProgramExceptionEntry routines perform return instructions, execution of the debugger$_x$ program resumes at location A+4 (step 747).

This example concludes with reference to FIG. 7i. Debugger$_x$ 101-X is now active again. It can resume execution of the program code 725 in the manner described above with respect to debugger$_1$ 101-1 with reference to FIG. 7c. Upon exiting the DebuggerCoreEntry and ProgramExceptionEntry routines (steps 749 and 751), the requested execution breakpoint at location B (indicated in the debugger$_x$ vars area 723) is actually planted at memory location B. Now, each debugger has a breakpoint active. If location B is encountered, debugger$_x$ 101-X will again be invoked. And, if location A is encountered during this subsequent invocation of debugger$_x$ 101-X, then debugger$_1$ 101-1 will again be invoked.

The above description has explained how the present invention allows more thanlone debugger to be concurrently active in a computer. In accordance with another aspect of the invention, a default debugger can be provided, and an order of preference for alternative debugger selection specified by the user. This feature will now be described with reference to FIGS. 8a and 8b. Referring first to FIG. 8a, an error condition 803 is detected in an executing program 801. As part of its error handling routine, the executing program 801 makes a subroutine call to a debugger startup routine 807 ("DebugStr" routine in the pseudocode listing) within the debugger core unit 103.

The purpose of the debugger startup routine 807 is to determine which of a plurality of debuggers (not shown in FIG. 8a) to activate, and then to activate that debugger. For the purpose of this example, it will be assumed that a choice is to be made between activating a two-machine, source level debugger, designated Debugger$_x$, and a second, assembly language debugger, designated Debugger$_1$. Also for this example, it will be assumed that at the time that the computer's operating system was started up, the operator indicated that Debugger$_x$ was to be the "default debugger" (i.e., the debugger to be selected in the absence of an overriding alternative selection made by the user).

Referring now to FIG. 8b, the operation of the debugger startup routine 807 is as follows: At step 851, the debugger startup routine 807 determines whether the user 809 has indicated a preference as to which debugger to select. If a preference for Debugger$_1$ is indicated, then execution continues at step 857, where the Debugger1 Startup routine 813 is invoked. The Debugger$_1$ Startup routine 813 includes a hardcoded programmed break instruction 815 which will cause Debugger$_1$ to be activated in the manner described above with reference to FIG. 3. In the case of implementation on a PowerPC model 601 microprocessor, the hardcoded programmed break instruction 815 may be a suitably encoded TWI instruction, as fully described above.

If, at step 851, the user has indicated a preference to activate Debugger$_x$, then execution proceeds to step 855. Because Debugger$_x$ is a two-machine debugger, it is necessary, in step 855, for the debugger startup routine 807 to examine the implementation specific information 811 to determine whether the host portion of the Debugger$_x$ (i.e., the portion of Debugger$_x$ that resides in a second processor) has been successfully communicated with at least one time prior to this invocation of the debugger startup routine 807. If the Debugger$_x$ host portion has not previously been successfully communicated with, then the debugger startup routine 807 will select the Debugger$_1$ for activation by continuing execution at step 857, which operates as described above.

If there has been a previously successful communication with the Debugger$_x$ host portion, then execution continues, instead, from step 855 to step 859. At step 859 the Debugger$_x$ Startup routine 817 is invoked. Operation of the Debugger$_x$ Startup routine 817 is similar to that of the Debugger$_1$ Startup routine, in that the Debugger$_x$ Startup routine 817 includes a hardcoded programmed break instruction 819 which will cause Debugger$_x$ to be activated in the manner described above with reference to FIG. 3.

After the activated debugger (either Debugger$_1$ or Debugger$_x$) completes its operation and returns control to the debugger startup routine 807, the debugger startup routine 807 returns (step 861) to the executing program 801 that called it.

Referring back, now, to step 851, if no user preference for a debugger selection is indicated, then execution of the debugger startup routine 807 proceeds to step 853. At step 853, the implementation specific information 811 is examined to determine which of the two debuggers was previously designated, at operating system startup, as the default debugger, and a branch is made alternatively to step 857 (Debugger$_1$ is default debugger) or to step 855 (Debugger$_x$ is default debugger). Operation of the debugger startup routine 807 proceeds from either of these steps as fully described above.

As shown in FIG. 8a, both the Debugger$_1$ Startup routine 813 and the Debugger$_x$ Startup routine 817 are located within the debugger core unit 103. This is not a strict requirement, since the programmer of the executing program 801 could, in theory, directly code the programmed break instructions 815, 819 within the code of the executing program 801. However, the implementation described above is preferable because it eliminates the need for the designer of the debugger core unit 103 to publish the details regarding how to invoke a particular debugger. This factor is important to permit future versions of the debugger core 103 to change these details while maintaining upward compatibility with previously written application programs that use these features.

The remainder of this description comprises the pseudocode listings that completely describe, in detail, the operation of the debugger core unit 103 in accordance with the present invention.

The invention has been described with reference to a particular embodiment. However, it will be readily apparent to those skilled in the art that it is possible to embody the invention in specific forms other than those of the preferred embodiment described above. This may be done without departing from the spirit of the invention. The preferred embodiment is merely illustrative and should not be considered restrictive in any way. The scope of the invention is given by the appended claims, rather than the preceding description, and all variations and equivalents which fall within the range of the claims are intended to be embraced therein.

DebuggerCore Private (Continued)

```
/* Routine to be called when breakpoint occurs*/
Dc_NextAction (*DebuggerEntry)(
                const Dc_Why whyBother,         /*why the debugger was entered*/
                const WORD breakNumber,         /*if a breakpoint which one*/
                const char* UserString,         /*an optional string depending on breakpoint type*/
                const DebuggerState myState,    /*reference to the variables area within
                                                  debuggercore for this debugger*/
                WORD& numberSteps               /*On single step trap the number of steps to take*/
                ); /*Pointer to string if user break*/
} DebuggerVars;

/******************************************************************/
/*      The following are routines in DebuggerASM.s that are called from    */
/*      the C code.                                                         */
/******************************************************************/

// The following routine is called to set a breakpoint at a physical address
// The old instruction needs to have been previously saved.
extern "C"{
    void BuildBreakPoint(PhysicalAddress AddressOfBreakPoint,   // where breakpoint will go
                         BYTE DebuggerID,                       // Index of the debugger
                         BYTE BreakPointType);                  // Type code for the breakpoint Boolean IsBreakPoint(LONG potentialBreakPoint);   //This routine will test an instruction to
                                                      //see if it is a DebuggerCore breakpoint
};

extern "C" DebuggerVars* gDebuggerVarsPointer[kNumberSupportedDebuggers];

// These BATs are used by the Debugger to map various spaces.

extern BlockAddressTranslationEntry gDebuggerBATforSpace0;
extern BlockAddressTranslationEntry gDebuggerBATforSpace1;
extern BlockAddressTranslationEntry gDebuggerBATforSpace2;
extern BlockAddressTranslationEntry gDebuggerBATforDemand;
```

What is claimed is:

1. In a program debugging system for debugging a program, a debugger core unit comprising:

a plurality of debugger memory areas, each exclusively associated with a corresponding one of a plurality of debuggers;

means, responsive to an exception condition associated with the program, for selecting one debugger from the plurality of debuggers, wherein selection is made by determining which one of the plurality of debuggers is associated with the exception condition;

means, coupled to the selecting means, for storing computer state information into a selected one of the plurality of debugger memory areas, the selected debugger memory area being exclusively associated with the selected debugger;

means, coupled to the selecting means, for storing debugger state information into the selected debugger memory area; and means, coupled to the selecting means, for activating the selected debugger.

2. The debugger core unit of claim 1, further comprising means for registering a new debugger, whereby the new debugger is added to the plurality of debuggers.

3. The debugger core unit of claim 1, further comprising:

means for receiving a debugging command from the selected debugger, and wherein the debugger state information storing means updates debugger state information based on the received debugging command, and stores the updated debugger state information into the selected debugger memory area.

4. The debugger core unit of claim 3, further comprising means for controlling a hardware resource in accordance with the received debugging command.

5. The debugger core unit of claim 4, wherein the hardware resource controlling means retrieves the updated debugger state information from the selected debugger memory area, and controls the hardware resource in accordance therewith.

6. The debugger core unit of claim 5, wherein:

the updated debugger state information includes an indication that a breakpoint is set at a memory location; and the hardware resource controlling means, in response to the breakpoint indication being included in the updated debugger state information that is stored in the selected debugger memory area, controls the hardware resource by setting a breakpoint that includes information associating the set breakpoint with the selected debugger.

7. The debugger core unit of claim 6, wherein the breakpoint is alternatively an execution breakpoint, a memory access breakpoint, and a memory modification breakpoint.

8. The debugger core unit of claim 6, wherein:

the received debugging command is a set breakpoint command, and the debugger state information storing means, in response to the received set breakpoint command, updates the debugger state information to include the indication that a breakpoint is set.

9. In a computer system comprising first and second debuggers, each presenting a corresponding interface to a corresponding user, wherein the user uses each of the interfaces to debug a program by examining and modifying computer state information, a method for operating the computer system so as to have the first and second debuggers concurrently active for debugging the program, comprising the steps of:

storing first debugger state information in a first debugger memory area;

storing second debugger state information in a second debugger memory area;

receiving, from each of the first and second debuggers, primitive service requests to modify the computer state information, and in response thereto storing respective indications of the received primitive service requests in the corresponding first and second debugger memory areas; and in response to the first debugger relinquishing control of the computer system, modifying the computer state in accordance with the indications of the received primitive service requests stored in the first debugger memory area.

10. The method of claim 9, wherein:

at least one of the primitive service requests received from the first debugger includes a request to set a breakpoint; and the step of modifying the computer state comprises setting the breakpoint, and including therein information associating the breakpoint with the first debugger.

11. The method of claim 10, further comprising the steps of:

halting execution of the program in response to execution of the breakpoint;

examining the breakpoint information to identify which of the first and second debuggers the breakpoint is associated with; and activating the identified debugger.

12. In a computer system comprising a plurality of debuggers, each presenting a corresponding interface to a user, wherein the user uses each of the interfaces to debug a computer program by examining and modifying a computer state, a method for debugging the computer program, comprising the steps of:

associating each of a plurality of debugger memory areas with a corresponding one of the plurality of debuggers;

selecting, in response to an exception condition, one debugger from the plurality of debuggers, wherein selection is made by determining which one of the plurality of debuggers is associated with the exception condition;

storing computer state information into a selected one of the plurality of debugger memory areas, the selected debugger memory area being exclusively associated with the selected debugger;

storing debugger state information into the selected debugger memory area; and activating the selected debugger.

13. The method of claim 12, further comprising the step of registering a new debugger, whereby the new debugger is added to the plurality of debuggers.

14. The method of claim 12, further comprising the steps of:

receiving a debugging command from the selected debugger;

updating debugger state information based on the received debugging command; and storing the updated debugger state information into the selected debugger memory area.

15. The method of claim 14, further comprising the step of controlling a hardware resource in accordance with the received debugging command.

16. The method of claim 15, wherein the step of controlling a hardware resource in accordance with the received debugging command comprises the steps of:

retrieving the updated debugger state information from the selected debugger memory area; and controlling the hardware resource in accordance with the retrieved updated debugger state information.

17. The method of claim 16, wherein:

the updated debugger state information includes an indication that a breakpoint is set at a memory location; and the step of controlling the hardware resource in accordance with the retrieved updated debugger state information comprises, in response to the breakpoint indication being included in the updated debugger state information that is stored in the selected debugger memory area, controlling the hardware resource by setting a breakpoint that includes information associating the set breakpoint with the selected debugger.

18. The method of claim 17, wherein the breakpoint is alternatively an execution breakpoint, a memory access breakpoint, and a memory modification breakpoint.

19. The method of claim 17, wherein the step of updating debugger state information based on the received debugging command comprises the steps of:

determining that the received debugging command is a set breakpoint command; and in response to the received set breakpoint command, updating the debugger state information to include the indication that a breakpoint is set.

20. In a program debugging system for debugging a program, a debugger core unit comprising:

a plurality of debugger memory areas, each exclusively associated with a corresponding one of a plurality of debuggers;

means, responsive to a request made by the program, for selecting one debugger from the plurality of debuggers, the selecting means comprising:

default means for selecting a default debugger from the plurality of debuggers;

means, coupled to the selecting means, for storing computer state information into a selected one of the plurality of debugger memory areas, the selected debugger memory area being exclusively associated with the selected debugger;

means, coupled to the selecting means, for storing debugger state information into the selected debugger memory area; and means, coupled to the selecting means, for activating the selected debugger.

21. The debugger core unit of claim 20, wherein the selecting means further comprises means for alternatively outputting as the selected debugger a user preferred one of the plurality of debuggers, and if no user preferred one of the plurality of debuggers exists, then the selected default debugger.

* * * * *